US012220715B2

(12) United States Patent
Davies et al.

(10) Patent No.: US 12,220,715 B2
(45) Date of Patent: Feb. 11, 2025

(54) DUAL-HEAD SHOWER ASSEMBLIES

(71) Applicant: Kohler Co., Kohler, WI (US)

(72) Inventors: Jack E. Davies, Sheboygan, WI (US); Brandon H. Miller, Sheboygan, WI (US)

(73) Assignee: KOHLER CO., Kohler, WI (US)

(*) Notice: Subject to any disclaimer, the term of this patent is extended or adjusted under 35 U.S.C. 154(b) by 150 days.

(21) Appl. No.: 17/112,946

(22) Filed: Dec. 4, 2020

(65) Prior Publication Data

US 2021/0178410 A1 Jun. 17, 2021

Related U.S. Application Data

(60) Provisional application No. 62/947,777, filed on Dec. 13, 2019.

(51) Int. Cl.
*B05B 1/18* (2006.01)
*B05B 15/652* (2018.01)

(52) U.S. Cl.
CPC ............ *B05B 1/185* (2013.01); *B05B 15/652* (2018.02)

(58) Field of Classification Search
CPC .............................. B05B 1/185; B05B 15/652
USPC .......................................................... 239/525
See application file for complete search history.

(56) References Cited

U.S. PATENT DOCUMENTS 1,218,879 A * 3/1917 Luzzi ........................ B05B 1/14 4/615
1,996,330 A * 4/1935 Goshaw ............. G05D 23/1346 236/92 R
2,534,378 A * 12/1950 Schlaich ................. B05B 12/10 4/615
3,067,943 A * 12/1962 Renne ................ G05D 23/1346 236/12.17
5,025,510 A 6/1991 Basile
(Continued)

FOREIGN PATENT DOCUMENTS

CA 2990451 A1 6/2019
CN 2048926 U 12/1989
(Continued)

OTHER PUBLICATIONS

First Chinese Office Action on CN Appl. Ser. No. 202011470723.X dated Apr. 6, 2022 (19 pages).

*Primary Examiner* — Chee-Chong Lee
(74) *Attorney, Agent, or Firm* — FOLEY & LARDNER LLP

(57) ABSTRACT

A shower assembly includes a stationary base and an inlet assembly configured to rotate relative to the stationary base. The inlet assembly includes a pivot rotatably coupled to the stationary base, a first arm extending radially from the pivot, and a second arm extending radially from the pivot, opposite the first arm. The shower assembly further includes a showerhead disposed on an end of the first arm and a first ball joint disposed between the showerhead and the end of the first arm. A docking member is disposed on an end of the second arm and has a second ball joint disposed between the docking member and the end of the second arm. The docking member includes a magnet disposed therein. A removable hand shower including a ferromagnetic element is configured to magnetically couple to the magnet of the docking member.

17 Claims, 23 Drawing Sheets

(56) References Cited

U.S. PATENT DOCUMENTS

| | | | | |
|---|---|---|---|---|
| 5,230,472 | A * | 7/1993 | McCabe | B05B 1/1609 239/443 |
| 5,400,820 | A | 3/1995 | Orth | |
| 5,573,664 | A | 11/1996 | Kuo | |
| 5,699,832 | A | 12/1997 | Burchard et al. | |
| 5,911,240 | A | 6/1999 | Kolar et al. | |
| 6,093,313 | A | 7/2000 | Bovaird et al. | |
| 6,123,837 | A | 9/2000 | Wadsworth et al. | |
| 6,446,278 | B1 | 9/2002 | Lin | |
| 6,594,832 | B2 | 7/2003 | Yang | |
| 6,641,727 | B1 | 11/2003 | Aldred et al. | |
| 6,691,902 | B2 | 2/2004 | Gomez | |
| 6,814,306 | B1 | 11/2004 | Okubo | |
| 6,962,168 | B2 | 11/2005 | Mcdaniel et al. | |
| 6,968,860 | B1 | 11/2005 | Indiana | |
| 7,111,796 | B2 | 9/2006 | Olson | |
| 7,360,723 | B2 | 4/2008 | Lev | |
| 7,468,127 | B2 | 12/2008 | Hsu | |
| 7,487,796 | B2 | 2/2009 | Imler et al. | |
| 7,608,936 | B2 | 10/2009 | Makoto et al. | |
| 7,665,676 | B2 | 2/2010 | Lev | |
| 7,717,270 | B2 | 5/2010 | Instapure | |
| 7,743,788 | B2 | 6/2010 | Schmitt et al. | |
| 7,919,877 | B2 | 4/2011 | Shimizu et al. | |
| 7,956,480 | B2 | 6/2011 | Masahiro | |
| 8,066,204 | B2 | 11/2011 | Petrovic et al. | |
| 8,205,846 | B2 | 6/2012 | Glunk | |
| 8,413,686 | B2 | 4/2013 | Ko | |
| 8,479,772 | B2 | 7/2013 | Petrovic et al. | |
| 8,572,772 | B2 | 11/2013 | Wolf et al. | |
| 8,573,200 | B2 | 11/2013 | Busch et al. | |
| 8,621,681 | B2 | 1/2014 | Macan et al. | |
| 8,713,725 | B2 | 5/2014 | Alder et al. | |
| 8,955,536 | B2 | 2/2015 | Bell et al. | |
| 9,044,767 | B2 | 6/2015 | Zhu et al. | |
| 9,050,612 | B2 | 6/2015 | Miller et al. | |
| 9,085,006 | B2 | 7/2015 | Wu et al. | |
| 9,085,879 | B2 | 7/2015 | Mielke et al. | |
| 9,175,459 | B2 | 11/2015 | Zhang et al. | |
| 9,263,752 | B2 | 2/2016 | Zimmermann et al. | |
| 9,334,632 | B2 | 5/2016 | Yang et al. | |
| 9,376,791 | B2 | 6/2016 | Wilkerson et al. | |
| 9,399,859 | B2 | 7/2016 | Allen et al. | |
| 9,438,977 | B2 | 9/2016 | Wang et al. | |
| 9,440,248 | B2 | 9/2016 | Pouliaude | |
| 9,481,985 | B1 | 11/2016 | Chen et al. | |
| 9,486,817 | B2 | 11/2016 | Patton et al. | |
| 9,566,593 | B2 | 2/2017 | Marty et al. | |
| 9,587,384 | B2 | 3/2017 | Schoolcraft et al. | |
| 9,624,654 | B2 | 4/2017 | Tseng et al. | |
| 9,656,280 | B2 | 5/2017 | Pitsch et al. | |
| 9,663,926 | B2 | 5/2017 | Schurle et al. | |
| 9,797,118 | B2 | 10/2017 | Bosio | |
| 9,822,512 | B2 | 11/2017 | Chan | |
| 9,828,752 | B2 | 11/2017 | Genord et al. | |
| 9,849,471 | B2 | 12/2017 | Lin et al. | |
| 9,855,568 | B2 | 1/2018 | Hawkins | |
| 9,896,826 | B2 | 2/2018 | Yuan et al. | |
| 9,919,331 | B2 | 3/2018 | Scheffer et al. | |
| 9,919,939 | B2 | 3/2018 | Rosko et al. | |
| 9,943,863 | B2 | 4/2018 | Huffington et al. | |
| 9,988,796 | B2 | 6/2018 | Bosio | |
| 9,988,797 | B2 | 6/2018 | Reeder et al. | |
| 10,000,913 | B2 | 6/2018 | Esche et al. | |
| 10,017,923 | B2 | 7/2018 | Genord et al. | |
| 10,046,340 | B2 | 8/2018 | Lin et al. | |
| 10,046,341 | B2 | 8/2018 | Wu et al. | |
| 10,047,506 | B2 | 8/2018 | Wagner et al. | |
| 10,060,105 | B2 | 8/2018 | Lin et al. | |
| 10,132,064 | B2 | 11/2018 | Myers et al. | |
| 10,150,121 | B2 | 12/2018 | Lin et al. | |
| 10,166,564 | B2 | 1/2019 | Pouliaude et al. | |
| 10,171,900 | B2 | 1/2019 | Hanna et al. | |
| 10,227,759 | B2 | 3/2019 | Li et al. | |
| 10,227,761 | B2 | 3/2019 | Braddock et al. | |
| 10,233,619 | B1 | 3/2019 | Lin et al. | |
| 10,260,216 | B2 | 4/2019 | Zhu et al. | |
| 10,260,217 | B2 | 4/2019 | Enlow et al. | |
| 10,274,096 | B2 | 4/2019 | Chiu et al. | |
| 10,399,094 | B2 | 9/2019 | Huffington et al. | |
| 10,406,539 | B2 | 9/2019 | Lin et al. | |
| 10,464,077 | B2 | 11/2019 | Lin et al. | |
| 2003/0102256 | A1 | 6/2003 | Takagi | |
| 2007/0022528 | A1 | 2/2007 | Gilbert | |
| 2009/0120516 | A1 | 5/2009 | Paini | |
| 2009/0188995 | A1 | 7/2009 | Makoto et al. | |
| 2010/0006166 | A1 | 1/2010 | Chen et al. | |
| 2010/0037391 | A1 | 2/2010 | Rudesill | |
| 2010/0043135 | A1 | 2/2010 | Patterson et al. | |
| 2010/0170587 | A1 | 7/2010 | Kaess | |
| 2011/0043113 | A1 | 2/2011 | Weng et al. | |
| 2011/0084474 | A1 | 4/2011 | Paden et al. | |
| 2012/0011701 | A1 | 1/2012 | Bernshtein | |
| 2013/0299608 | A1 | 11/2013 | Spangler et al. | |
| 2013/0320116 | A1 | 12/2013 | Jonte et al. | |
| 2014/0054398 | A1* | 2/2014 | Lev | E03C 1/0409 239/443 |
| 2014/0150896 | A1 | 6/2014 | Chucheng et al. | |
| 2015/0014986 | A1 | 1/2015 | Chen et al. | |
| 2015/0115064 | A1* | 4/2015 | Wu | B05B 1/185 239/443 |
| 2015/0217314 | A1 | 8/2015 | Kharbanda | |
| 2016/0025246 | A1 | 1/2016 | Nelson et al. | |
| 2016/0122982 | A1 | 5/2016 | Wang | |
| 2016/0215482 | A1 | 7/2016 | Fourman et al. | |
| 2017/0014849 | A1 | 1/2017 | Gao et al. | |
| 2017/0165684 | A1 | 6/2017 | Lin et al. | |
| 2017/0259279 | A1 | 9/2017 | Lin et al. | |
| 2017/0266672 | A1 | 9/2017 | Goisot et al. | |
| 2017/0299064 | A1 | 10/2017 | Zock-Obregon | |
| 2017/0328043 | A1 | 11/2017 | Tzeng | |
| 2018/0030700 | A1 | 2/2018 | Zindler et al. | |
| 2018/0193851 | A1 | 7/2018 | L'Henaff et al. | |
| 2018/0274214 | A1 | 9/2018 | Rosko et al. | |
| 2018/0291601 | A1 | 10/2018 | Genord et al. | |
| 2019/0003162 | A1 | 1/2019 | Fourman et al. | |
| 2019/0072193 | A1 | 3/2019 | Guo | |
| 2019/0083991 | A1 | 3/2019 | Lin et al. | |
| 2019/0176170 | A1 | 6/2019 | Lee et al. | |
| 2019/0218755 | A1 | 7/2019 | Nelson | |
| 2019/0247868 | A1 | 8/2019 | Huffington et al. | |
| 2019/0249401 | A1 | 8/2019 | Mu et al. | |

FOREIGN PATENT DOCUMENTS

| | | | |
|---|---|---|---|
| CN | 2092012 | U | 1/1992 |
| CN | 2832930 | Y | 11/2006 |
| CN | 2921509 | Y | 7/2007 |
| CN | 200970559 | Y | 11/2007 |
| CN | 101251205 | A | 8/2008 |
| CN | 201180843 | Y | 1/2009 |
| CN | 201211505 | Y | 3/2009 |
| CN | 101537687 | B | 9/2009 |
| CN | 201446026 | U | 5/2010 |
| CN | 101761666 | A | 6/2010 |
| CN | 201517652 | U | 6/2010 |
| CN | 201610948 | U | 10/2010 |
| CN | 201823622 | U | 5/2011 |
| CN | 201988487 | U | 9/2011 |
| CN | 202045025 | U | 11/2011 |
| CN | 102278513 | A | 12/2011 |
| CN | 202132601 | U | 2/2012 |
| CN | 202238401 | U | 5/2012 |
| CN | 202432067 | U | 9/2012 |
| CN | 202441943 | U | 9/2012 |
| CN | 102728493 | A | 10/2012 |
| CN | 202527291 | U | 11/2012 |
| CN | 202546003 | U | 11/2012 |
| CN | 202570479 | U | 12/2012 |
| CN | 202580191 | U | 12/2012 |
| CN | 102873000 | A | 1/2013 |
| CN | 202674524 | U | 1/2013 |
| CN | 202901333 | U | 4/2013 |
| CN | 202927215 | U | 5/2013 |

(56) References Cited

FOREIGN PATENT DOCUMENTS

| | | | |
|---|---|---|---|
| CN | 202927217 | U | 5/2013 |
| CN | 202962715 | U | 6/2013 |
| CN | 203023623 | U | 6/2013 |
| CN | 203080654 | U | 7/2013 |
| CN | 203220992 | U | 10/2013 |
| CN | 203247130 | U | 10/2013 |
| CN | 102372347 | B | 12/2013 |
| CN | 203320632 | U | 12/2013 |
| CN | 103521369 | A | 1/2014 |
| CN | 203448204 | U | 2/2014 |
| CN | 203470251 | U | 3/2014 |
| CN | 203591898 | U | 5/2014 |
| CN | 203603219 | U | 5/2014 |
| CN | 102500477 | B | 6/2014 |
| CN | 203828806 | U | 9/2014 |
| CN | 203917007 | U | 11/2014 |
| CN | 203972174 | U | 12/2014 |
| CN | 203972209 | U | 12/2014 |
| CN | 204004779 | U | 12/2014 |
| CN | 204114343 | U | 1/2015 |
| CN | 204573311 | U | 8/2015 |
| CN | 204647419 | U | 9/2015 |
| CN | 204703237 | U | 10/2015 |
| CN | 105333223 | A | 2/2016 |
| CN | 205013916 | U | 2/2016 |
| CN | 205084903 | U | 3/2016 |
| CN | 105840862 | A | 8/2016 |
| CN | 205410752 | U | 8/2016 |
| CN | 205444337 | U | 8/2016 |
| CN | 205534489 | U | 8/2016 |
| CN | 104878810 | B | 9/2016 |
| CN | 205557713 | U | 9/2016 |
| CN | 205559954 | U | 9/2016 |
| CN | 205578822 | U | 9/2016 |
| CN | 205599359 | U | 9/2016 |
| CN | 106040499 | B | 10/2016 |
| CN | 106076677 | B | 11/2016 |
| CN | 205745858 | U | 11/2016 |
| CN | 206130245 | U | 4/2017 |
| CN | 206175761 | U | 5/2017 |
| CN | 206221498 | U | 6/2017 |
| CN | 106993965 | A | 8/2017 |
| CN | 107504242 | A | 12/2017 |
| CN | 107642629 | A | 1/2018 |
| CN | 206859328 | U | 1/2018 |
| CN | 206918351 | U | 1/2018 |
| CN | 107701796 | A | 2/2018 |
| CN | 107930932 | A | 4/2018 |
| CN | 108005173 | A | 5/2018 |
| CN | 207400686 | U | 5/2018 |
| CN | 207500573 | U | 6/2018 |
| CN | 207567866 | U | 7/2018 |
| CN | 105840869 | B | 8/2018 |
| CN | 108397588 | A | 8/2018 |
| CN | 207786845 | U | 8/2018 |
| CN | 108644441 | A | 10/2018 |
| CN | 208058067 | U | 11/2018 |
| CN | 109268572 | A | 1/2019 |
| CN | 109538789 | A | 3/2019 |
| CN | 109538820 | A | 3/2019 |
| CN | 109718955 | A | 5/2019 |
| CN | 209041741 | U | 6/2019 |
| CN | 209067901 | U | 7/2019 |
| CN | 209130270 | U | 7/2019 |
| CN | 209211559 | U | 8/2019 |
| DE | 42 30 182 | A1 | 3/1993 |
| DE | 93 00 418 | U1 | 3/1993 |
| DE | 20 2011 002 906 | U1 | 11/2011 |
| DE | 10 2011 011 576 | A1 | 8/2012 |
| DE | 10 2013 003 925 | A1 | 9/2014 |
| DE | 20 2017 006 740 | U1 | 4/2018 |
| DE | 10 2017 202 670 | A1 | 8/2018 |
| DE | 10 2017 113 545 | A1 | 12/2018 |
| EP | 0 913 531 | B1 | 1/2005 |
| EP | 1 357 233 | B1 | 7/2006 |
| EP | 2 110 482 | B1 | 11/2011 |
| EP | 2 778 299 | A1 | 9/2014 |
| EP | 2 896 759 | B1 | 7/2015 |
| EP | 3 043 000 | A1 | 7/2016 |
| EP | 2 795 170 | B1 | 12/2018 |
| JP | 2000-080685 | A | 3/2000 |
| JP | 2000-263060 | A | 9/2000 |
| JP | 3078605 | U | 7/2001 |
| JP | 3106062 | U | 12/2004 |
| JP | 2008-050850 | A | 3/2008 |
| JP | 2008-050851 | A | 3/2008 |
| JP | 2008-050852 | A | 3/2008 |
| JP | 2008-054427 | A | 3/2008 |
| JP | 2008-054472 | A | 3/2008 |
| JP | 2008-061384 | A | 3/2008 |
| JP | 2008-086125 | A | 4/2008 |
| JP | 4441888 | B2 | 3/2010 |
| JP | 5671826 | B2 | 2/2015 |
| JP | 6046929 | B2 | 12/2016 |
| JP | 6349810 | B2 | 7/2018 |
| NL | 1028853 | C1 | 10/2006 |
| WO | WO-2008/107102 | A1 | 9/2008 |
| WO | WO-2008/107103 | A1 | 9/2008 |
| WO | WO-2016/000455 | A1 | 1/2016 |

* cited by examiner

DUAL-HEAD SHOWER ASSEMBLIES

CROSS-REFERENCE TO RELATED APPLICATION

This application claims the benefit of and priority to U.S. Provisional Application No. 62/947,777, filed on Dec. 13, 2019, the entire disclosure of which is hereby incorporated by reference herein.

BACKGROUND

The present application relates generally to shower assemblies. More specifically, the present application relates to shower assemblies that include a fixed showerhead and a removable hand shower. Further, the removable hand showers utilize either a mechanical docking system, a magnetic docking system, or a combination of a mechanical and magnetic docking system.

SUMMARY

Implementations described herein relate to various embodiments of shower assemblies. According to an example embodiment, a shower assembly includes a stationary base and an inlet assembly configured to rotate relative to the stationary base. The inlet assembly includes a pivot rotatably coupled to the stationary base, a first arm extending radially from the pivot, and a second arm extending radially from the pivot, opposite the first arm. The shower assembly further includes a showerhead disposed on an end of the first arm having a first ball joint disposed between the showerhead and the end of the first arm, a docking member disposed on an end of the second arm having a second ball joint disposed between the docking member and the end of the second arm, the docking member including a magnet disposed within the docking member, and a removable hand shower having a ferromagnetic element configured to magnetically couple to the magnet of the docking member.

In another embodiment, an inlet assembly of a shower assembly includes an inlet end configured to receive a water supply, a pivot configured to rotate about the inlet end, a first arm extending radially from the pivot, and a second arm extending radially from the pivot, opposite the first arm. The inlet assembly includes a diverter valve configured to rotate within the inlet assembly and direct water between a first path and a second path, such that the first path is defined by the first arm and is fluidly connected to a first outlet of the diverter valve and an inlet of a showerhead, and the second path is defined by a flexible hose and is fluidly connected to a second outlet of the diverter valve to an inlet of the removable hand shower. The inlet assembly further includes a docking member disposed on an end of the second arm, the docking member configured to magnetically couple to the removable hand shower.

In yet another embodiment, a shower assembly includes a stationary base and an inlet assembly configured to rotate relative to the stationary base. The inlet assembly includes a pivot rotatably coupled to the stationary base, a first arm extending radially from the pivot, and a second arm extending radially from the pivot, opposite the first arm. The shower assembly further includes a showerhead disposed on an end of the first arm having a first ball joint is disposed between the showerhead and the end of the first arm, a docking member disposed on an end of the second arm having a second ball joint is disposed between the docking member and the end of the second arm, the docking member comprising a magnet disposed within the docking member, and a removable hand shower including a ferromagnetic element configured to magnetically couple to the magnet of the docking member. The shower assembly further includes a diverter valve configured to rotate within the inlet assembly and direct water between a first path and a second path, wherein the first path is defined by the first arm and is fluidly connected to a first outlet of the diverter valve and an inlet of the showerhead, and the second path is defined by a flexible hose and is fluidly connected to a second outlet of the diverter valve to an inlet of the removable hand shower.

This summary is illustrative only and is not intended to be in any way limiting.

BRIEF DESCRIPTION OF THE DRAWINGS

The disclosure will become more fully understood from the following detailed description, taken in conjunction with the accompanying figures, wherein like reference numerals refer to like elements, in which.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, disclosed in this application are shower systems which incorporate a showerhead, a removable hand shower, and an inlet assembly, wherein the inlet assembly includes a diverter valve to control the water path between the showerhead and the removable hand shower. Further, each shower system includes an articulating feature (e.g. a rotational feature), which allows the showerhead and the removable hand shower to be reconfigured between different positions over an angular range (e.g., 360 degree range), including a vertical position and a horizontal position, for at least one embodiment, or between a forward/downward and rearward/upward rotation for at least one embodiment. The removable hand showers are configured to detachably dock or mount to an arm of the inlet assembly, such as magnetically.

Figure 1:
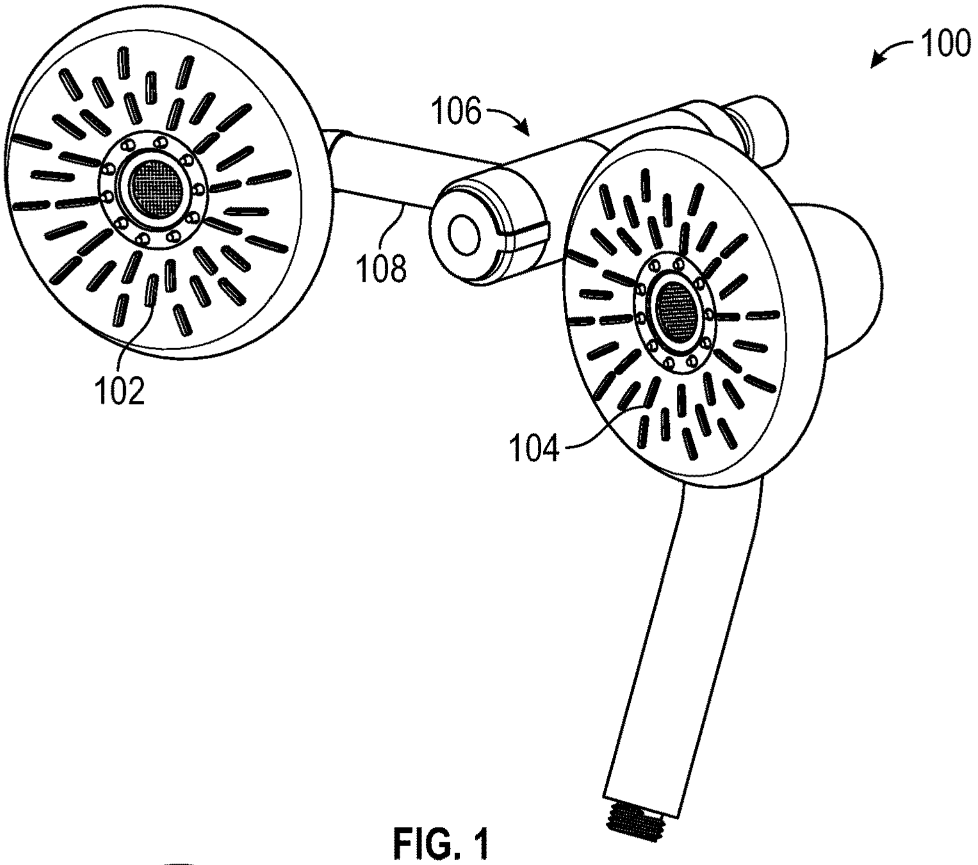
FIG. 1 is a perspective view of a shower assembly according to an exemplary embodiment.

Referring to FIG. 1, a shower assembly 100 is shown according to an exemplary embodiment. The shower assembly 100 includes a showerhead 102, a removable hand shower 104, and an inlet assembly 106. As will be understood from the features disclosed herein, shower assembly 100 creates a fully customizable shower for the user. The showerhead 102 is disposed on an end of a first arm 108 of inlet assembly 106. The illustrated showerhead 102 is a multifunction showerhead with non-dynamic (e.g. not oscillating) nozzles, although the showerheads can include different functionality (e.g., a single-function showerhead). A ball joint (not shown in FIG. 1, but shown in FIG. 4) allows a user to pivot the showerhead 102 about a point to provide a large range of motion for adjusting the spray direction of the showerhead to accommodate the user's needs.

Figure 5:
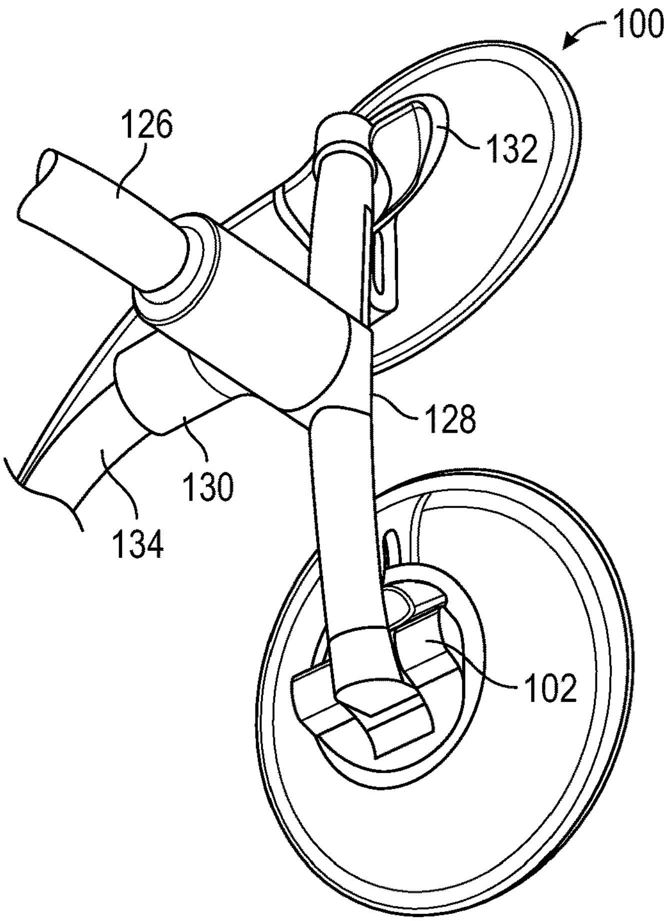
FIG. 5 is a perspective view of the shower assembly according to an exemplary embodiment.

Referring to FIGS. 2-3 and 29-30, the shower assembly 100 is further shown in further detail. The removable hand shower 104 magnetically docks to a docking member 112 disposed on an end of a second arm 110 of inlet assembly 106. The illustrated removable hand shower 104 is a multifunction showerhead with non-dynamic (e.g. not oscillating) nozzles, although any showerhead can be employed. A ball joint (not shown) is included between the docking member 112 and the end of a second arm 110, thus allowing the user to move the removable hand shower 104 in any direction to adjust the spray direction based on the user's needs. Alternatively, as shown in FIG. 5, the showerhead 102 and the removable hand shower 104 may be configured to only adjust in two directions.

Figure 2:
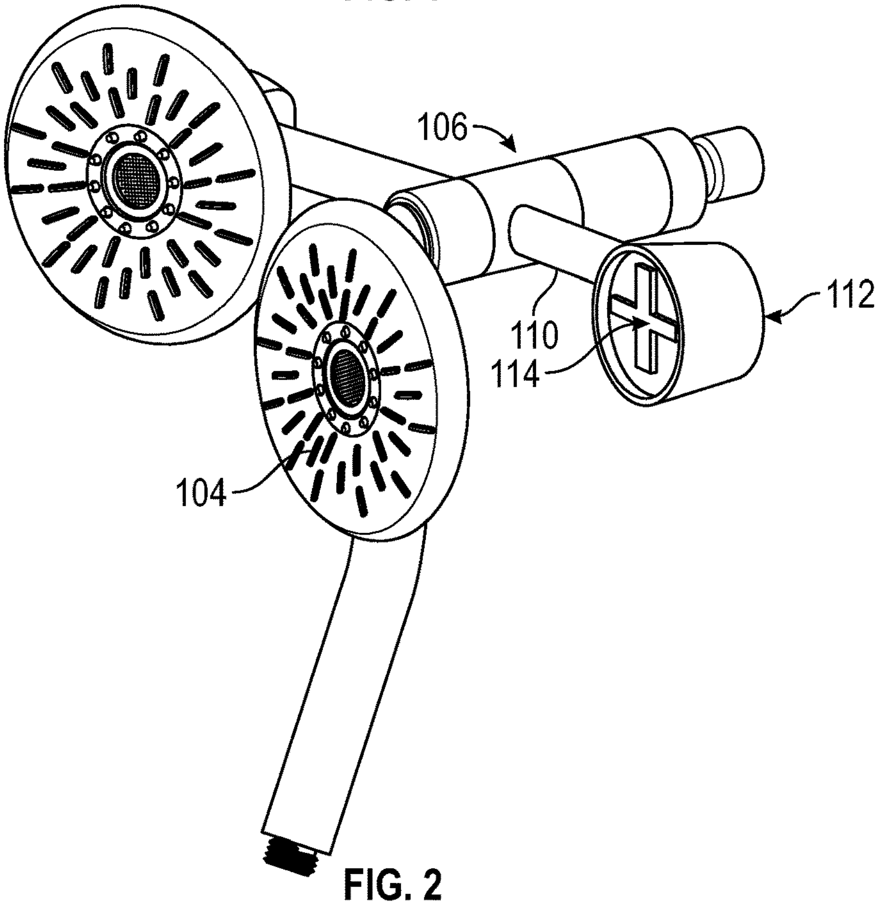
FIG. 2 is a perspective view of the shower assembly shown in FIG. 1.
Figure 3:
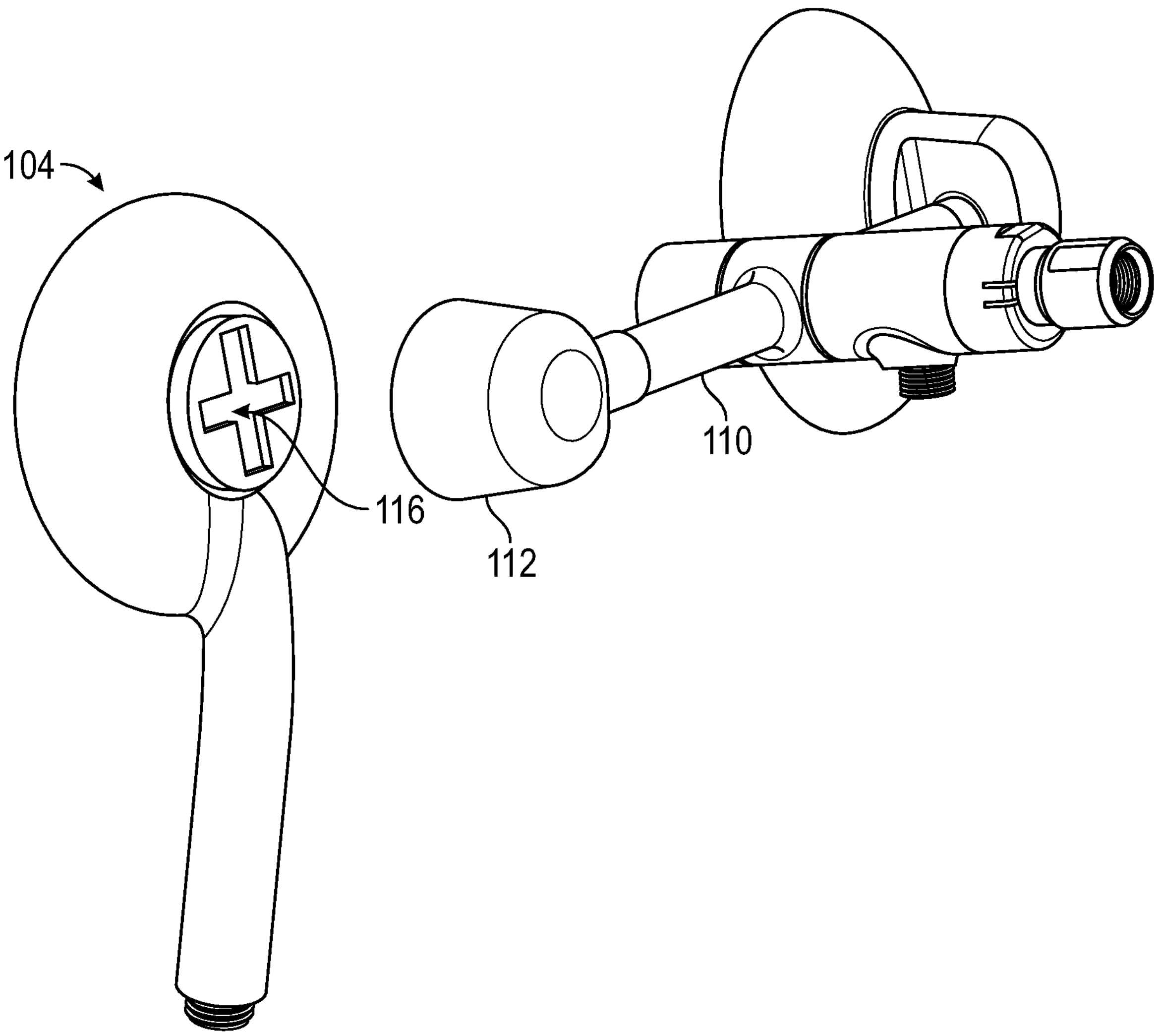
FIG. 3 is a perspective view of the shower assembly shown in FIG. 1.
Figure 29:
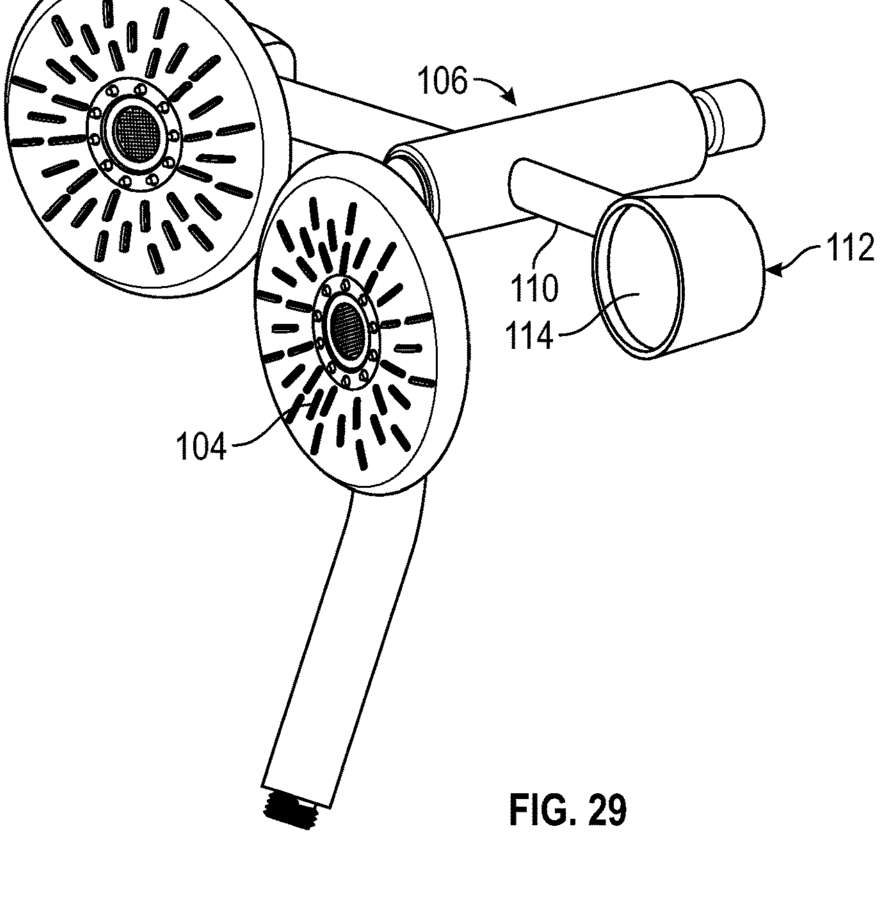
FIG. 29 is a perspective view of the shower assembly shown in FIG. 1.
Figure 30:
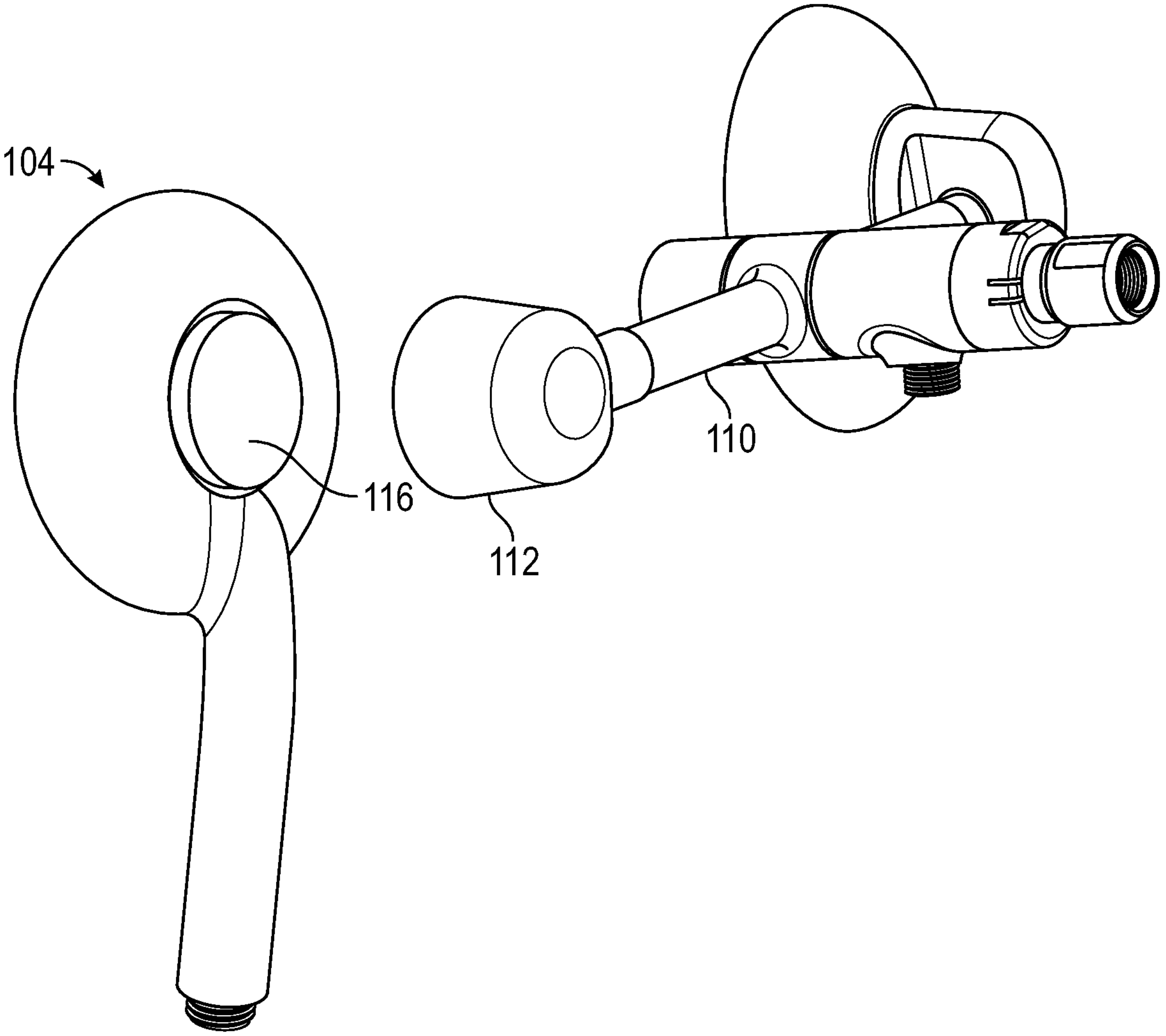
FIG. 30 is a perspective view of the shower assembly shown in FIG. 1.

Referring back to FIGS. 2-3 and 29-30, the docking member 112 includes a magnet 114. As shown in FIGS. 29-30, the docking member 112 does not include any mechanical feature. However, as shown in FIGS. 2-3, the docking member 112 may include a slight ridge on the surface of the docking member 112 that faces the removable hand shower 104. The slight ridge may be a cross or "+" shape. The slight ridge may be circular along the outside of the magnet 114. The removable hand shower 104 includes a corresponding depression 116. For instance, the depression 116 may be a cross or "+" shape, or the depression 116 may be circular, thus allowing a user to more easily dock due to the clear alignment between the docking member 112 and the removable hand shower 104. Further the slight ridge and corresponding depression 116 can provide additional docking support and security. Referring again to FIGS. 2-3 and 29-30, the magnet 114 may be a single magnet or a plurality of magnets. The magnet 114 may be a large disc magnet located in the docking member 112 which attracts a ferromagnetic element (e.g. a steel disc) located in the removable hand shower 104. The magnet 114 may be placed within the docking member 112 such that the magnet 114 is behind the surface. This surface may not be flat or even with the outer perimeter of the docking member 112 (i.e., the circular ridge) in order to leave space for the removable hand shower 104 to be slightly inserted. For instance, the steel disc to which the magnet 114 is attracted, is located on a back surface of the spray face of the removable hand shower 104, as illustrated in FIG. 3 with both a cross shaped and a circular depression 116 and in FIG. 30 with just the circular depression 116. The circular depression 116 is sized and shaped to fit within the ridge of the docking member 112, thus allows the magnet 114 to contact the steel disk. As such, a handle of the removable hand shower 104 is not used to dock. This allows for easy handling when removing and returning the removable hand shower 204 from the shower assembly 200 such that the inconvenience of placing a handle in a holder, tangling the hose, etc. is eliminated. The system could employ magnets in either one or both of the docking member 112 or the removable hand shower 104. Notably, the ridges and depressions discussed above are optional features. By way of further example, the shower assembly 100 shown in FIGS. 22-26 lacks any such ridges or depressions.

Figure 22:
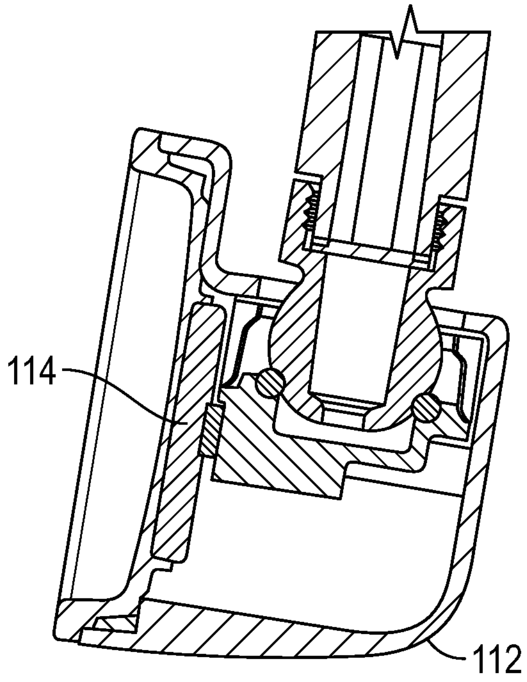
FIG. 22 is a cross-sectional view of a docking member of the shower assembly shown in FIG. 1.
Figure 23:
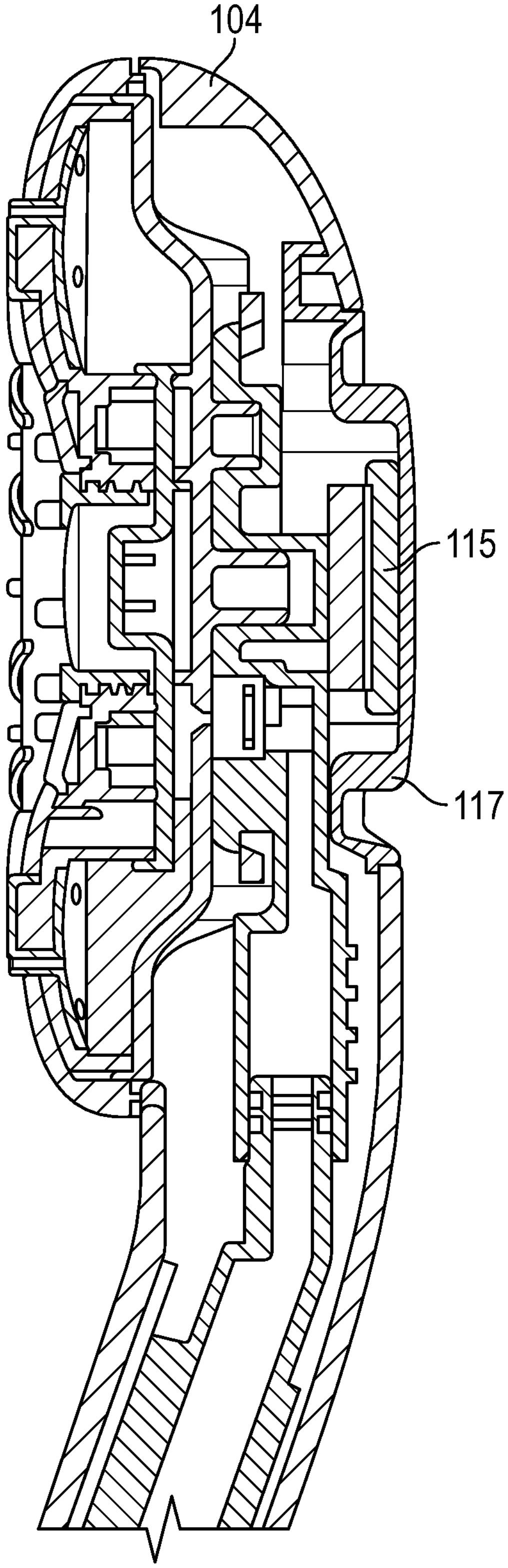
FIG. 23 is a cross-sectional view of a removable hand shower of the shower assembly shown in FIG. 1.
Figure 24:
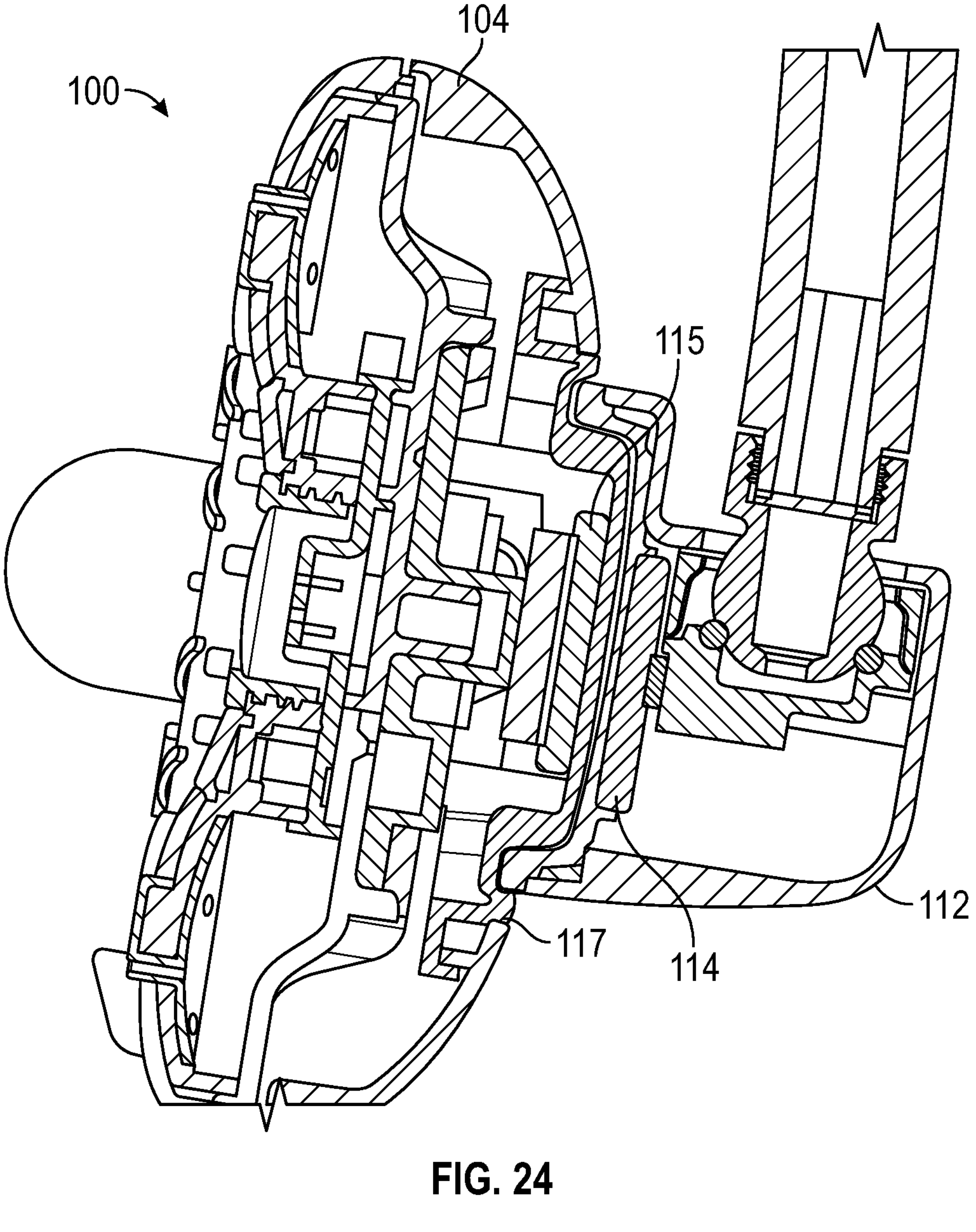
FIG. 24 is a cross-sectional view of a removable hand shower docked to a docking member of the shower assembly shown in FIG. 1.

Cross-sectional views of the docking member 112 and the removable hand shower 104, including the magnet 114 and a magnet 115, are shown in FIGS. 22-24. As described above, the docking member 112 may have the magnet 114 which attracts a ferromagnetic element in the removable hand shower 104. However, the removable hand shower 104 may include the magnet 115 in addition to the magnet 114 in the docking member 112. Alternatively, the removable hand shower 104 may include the magnet 115 while the docking member 112 includes a ferromagnetic element. As shown in FIG. 23, the magnet 115 may be a single magnet, such as shown, or a plurality of magnets. As shown, the magnet 115 is a large disc magnet located on the back of the removable hand shower 104 such that the back of the removable hand shower 104 is the side that faces/docks to the docking member 112. Casing 117 holds the magnet 115 in place and secures it to the surface of the removable hand shower 104. Casing 117 is sized and shaped to protrude from the removable hand shower 204 and be received by the docking member 112, as described above. In operation, the magnet 114 of the docking member 112 attracts or is attracted to the magnet 115 of the removable hand shower 104. No mechanical clips or fasteners are required to assist in docking the removable hand shower 104 to the docking member 112 in such a configuration. Only the magnets along with the shape of the docking member 112 and/or the shape of the removable hand shower 104 are necessary to hold the shower assembly 100 together in a docked position, as shown in FIG. 24. The magnets 114, 115, may be, for instance, standard Neodymium magnet(s) ranging from N38-N52, but any suitable magnet may be employed.

Figure 4:
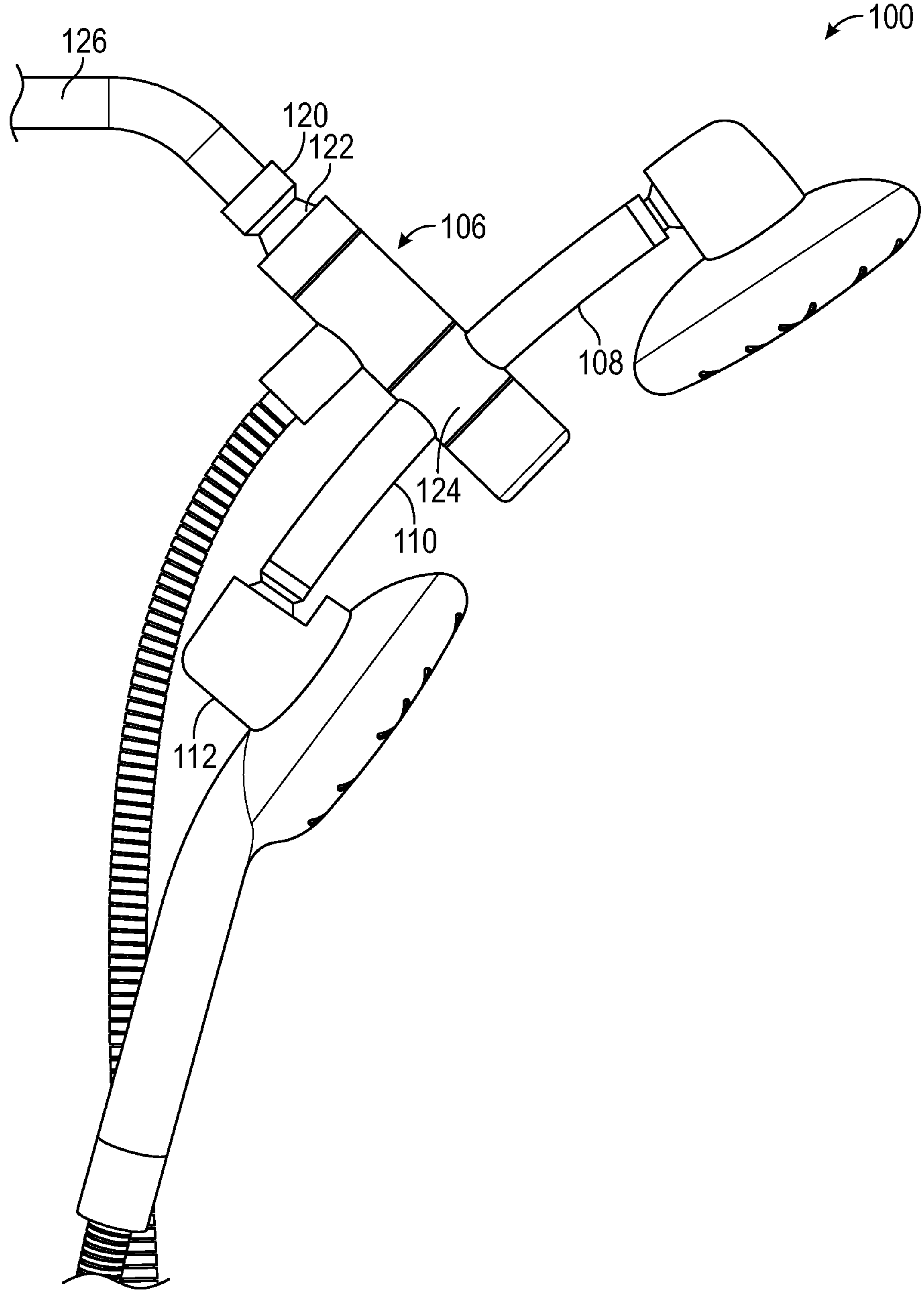
FIG. 4 is a perspective view of the shower assembly according to an exemplary embodiment.

Referring now to FIG. 4, the shower assembly 100 is shown in further detail. The inlet assembly 106 includes an inlet end 120 for mounting to a wall/support and for receiving a water supply. The inlet end 120 may include a threaded portion for securing the inlet end 120 to a water pipe and a ball joint 122 that allows for rotation of the inlet assembly 106. The shower assembly 100 includes a pivot 124, which is a circumferential base rotatable about the inlet assembly 106. The first and second arms 108, 110 extend from opposite sides of the pivot 124, as shown, and have a fixed configuration relative to each other (i.e., the first and second arms 108, 110 do not rotate separately). In this way, the showerhead 102 and the removable hand shower 104 can rotate from a vertical configuration to a horizontal configuration about an axis of the pivot 124, as shown in FIGS. 4 and 5, respectively. Note that the first and second arms 108, 110 and the pivot 124 can be integrally formed or formed separately and coupled together. The shower assembly 100 may include a detent or other locking feature every 90 degrees, and the pivot 124 may allow continuous 360 degree rotation of the showerhead 102 and the removable hand shower 104. During any rotation, the removable hand shower 104 may be docked to the docking member 112 and will remained docked, unless removed by the user.

Figure 25:
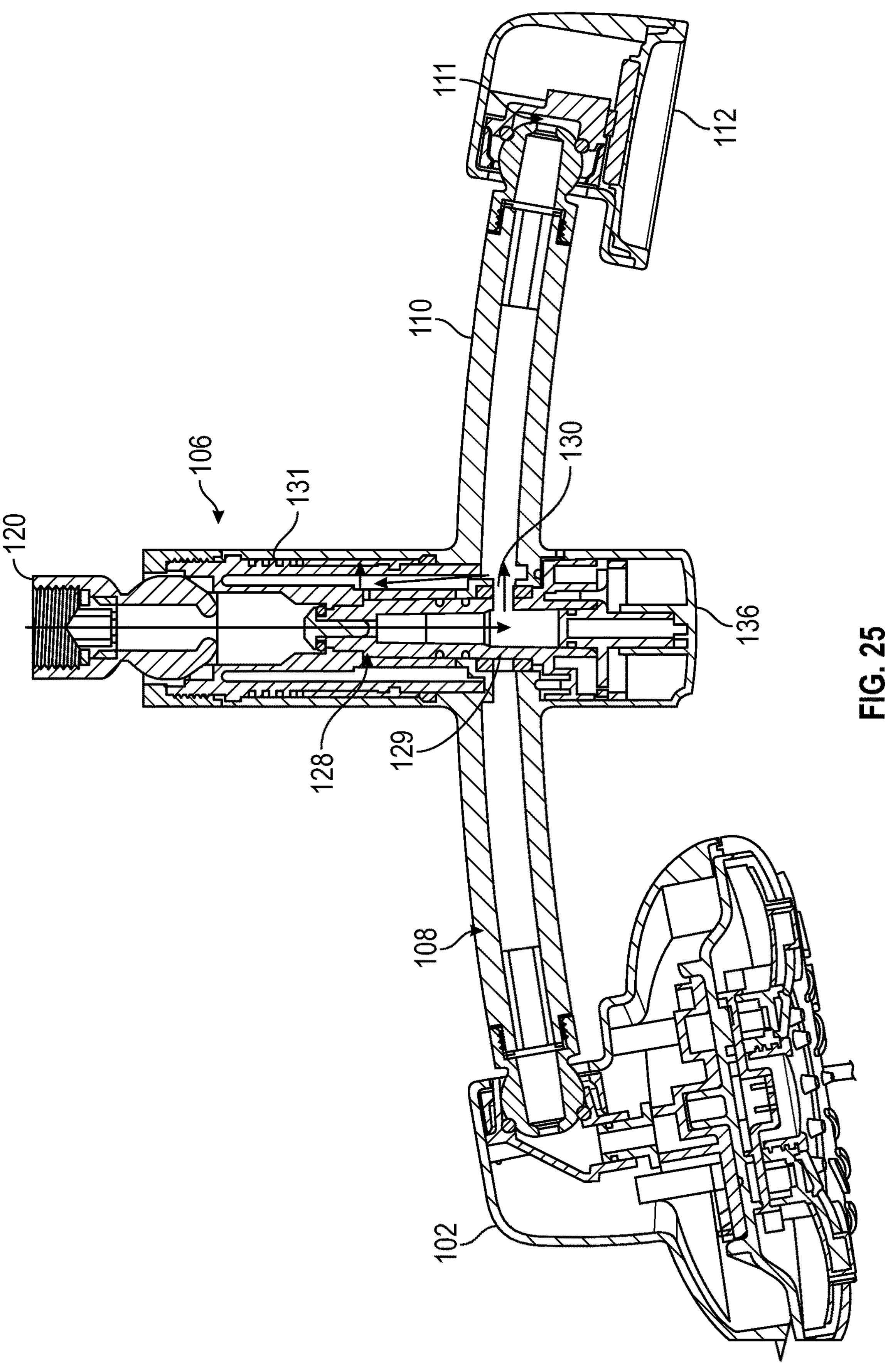
FIG. 25 is a cross-sectional view of an inlet assembly of the shower assembly shown in FIG. 1.
Figure 26:
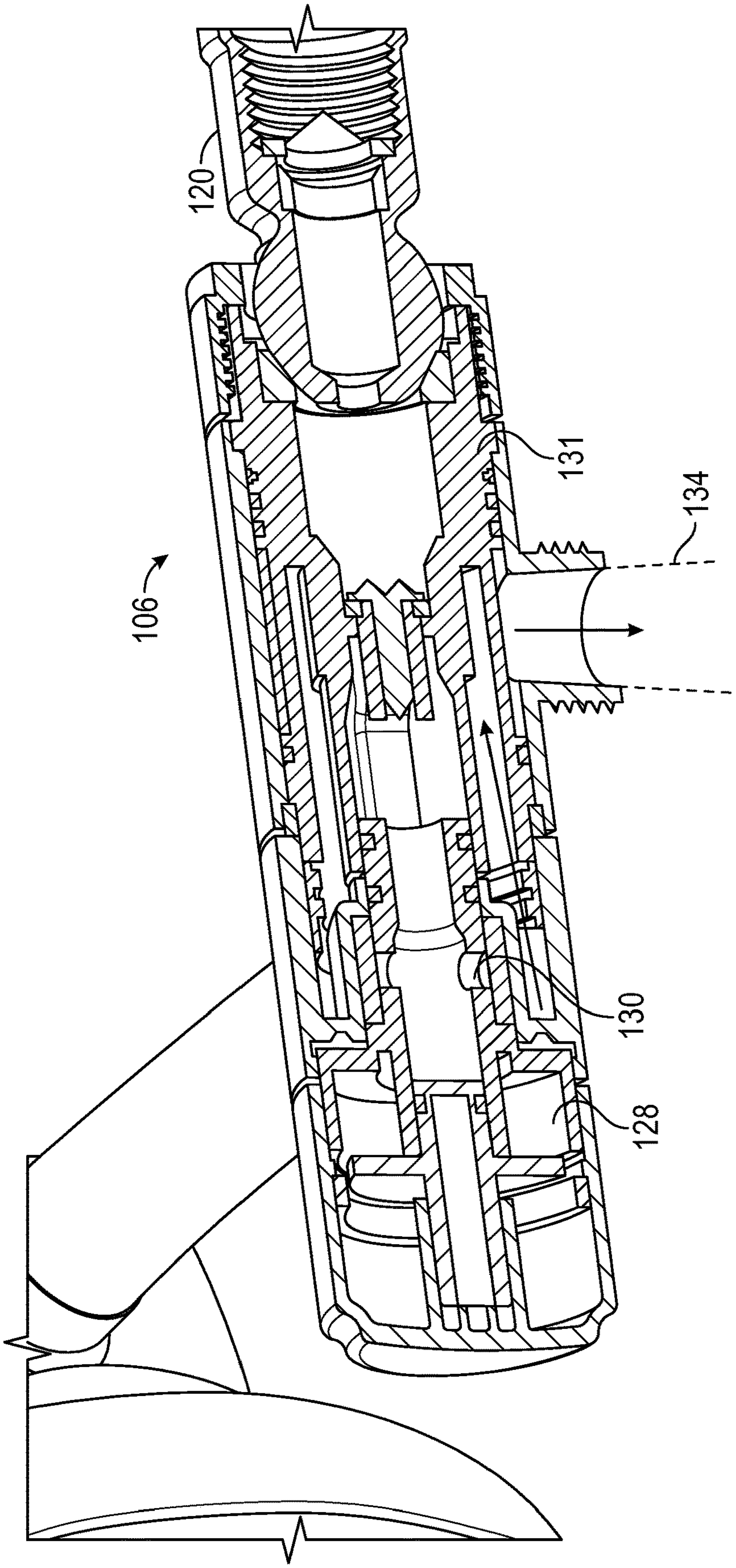
FIG. 26 is a cross-sectional view of an inlet assembly of the shower assembly shown in FIG. 1.

Referring to FIG. 5, the shower assembly 100 is shown in further detail. A shower base 126 may remain stationary such that the arms rotate about the shower base 126. A diverter valve 128 is located in the inlet assembly 106 to direct water between a first path, which supplies water to the showerhead 102, and a second path, which supplies water to the removable hand shower 104. The first path is defined by the first arm 108 and is fluidly connected to a first outlet (129, shown in FIG. 25) of the diverter valve 128. The second path is defined by a flexible hose 134 that interconnects a second outlet 130 of the diverter valve 128 to an inlet 132 of the removable hand shower 104. As shown in FIGS. 25 and 26, when water is diverted to the removable hand shower 104, the water flows from the inlet end 120 and through a waterway 131. The waterway 131 retains the water in the inlet assembly 106 and directs the water through the diverter valve 128. The diverter valve 128 is configured to rotate to direct between water paths, as further explained below. Further, at an end 111 of the second arm 110 there is no outlet, so when the water is on the second path, the water that flows through the second arm 110 is channeled back down the second path of the second arm 110 to the flexible hose 134. The orientation of the first and second arms 108, 110 do not affect the flow of the water, therefore water can be diverted between the two paths while the first and second arms 108, 110 are in any configuration. It is important to note that the diverter valve 128 rotates with the shower assembly 100. Design in FIG. 5 is similar to the embodiment shown in FIG. 1 except, for example, the embodiment in FIG. 5 doesn't include a ball joint. Because the shower base 126 is stationary and the rotation happens either at the ball joint 122 and/or the pivot 124, the flexible hose 134 remains hanging downward, toward the shower floor.

Figure 6:
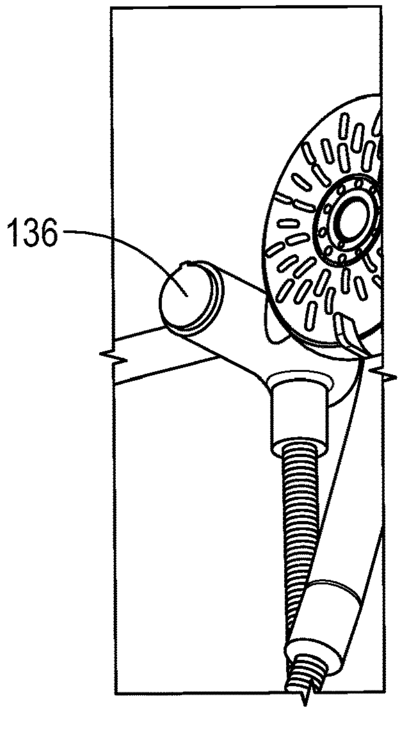
FIG. 6 is a detailed view of a diverter controller of the shower assembly shown in FIG. 1.
Figure 7:
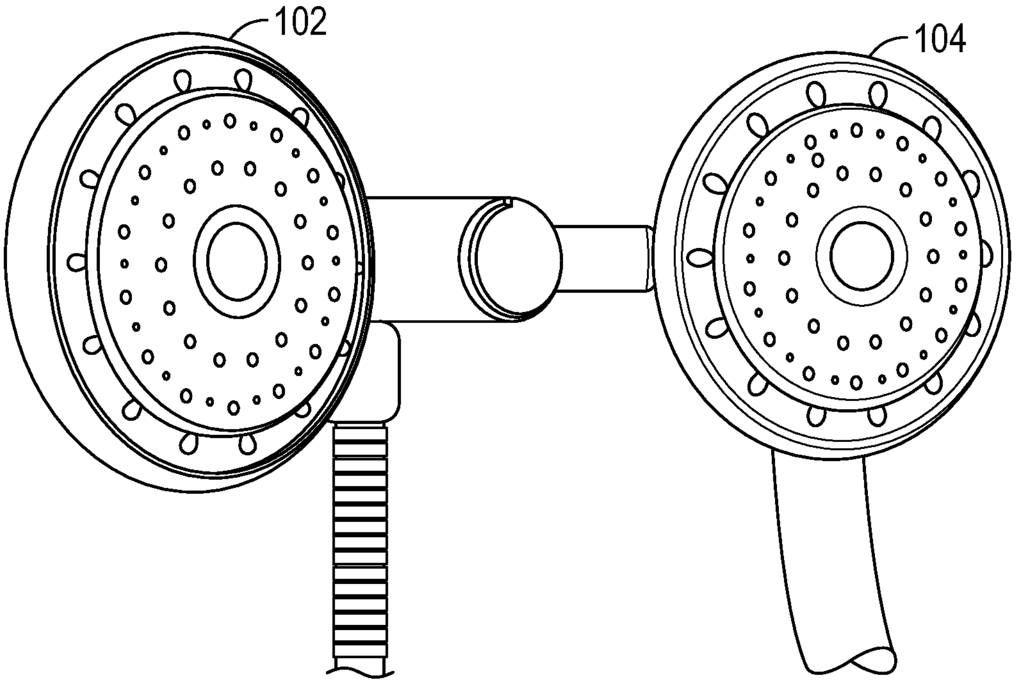
FIG. 7 is a perspective view of an alternative showerhead and removable hand shower shape of the shower assembly shown in FIG. 1.
Figure 8:
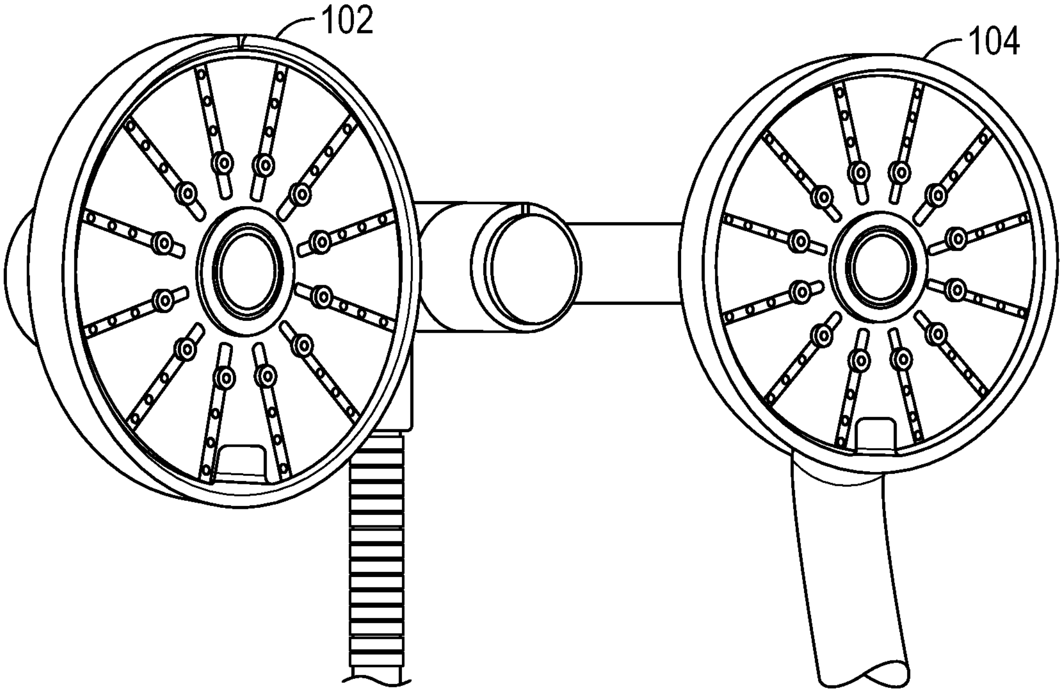
FIG. 8 is a perspective view of an alternative showerhead and removable hand shower shape of the shower assembly shown in FIG. 1.
Figure 9:
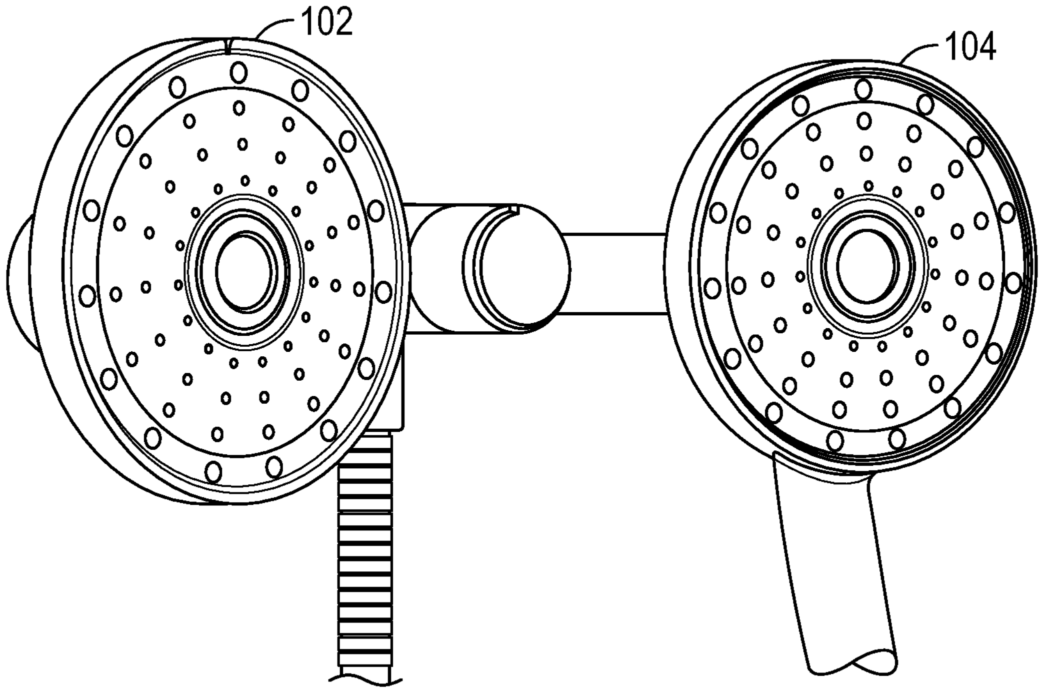
FIG. 9 is a perspective view of an alternative showerhead and removable hand shower shape of the shower assembly shown in FIG. 1.
Figure 10:
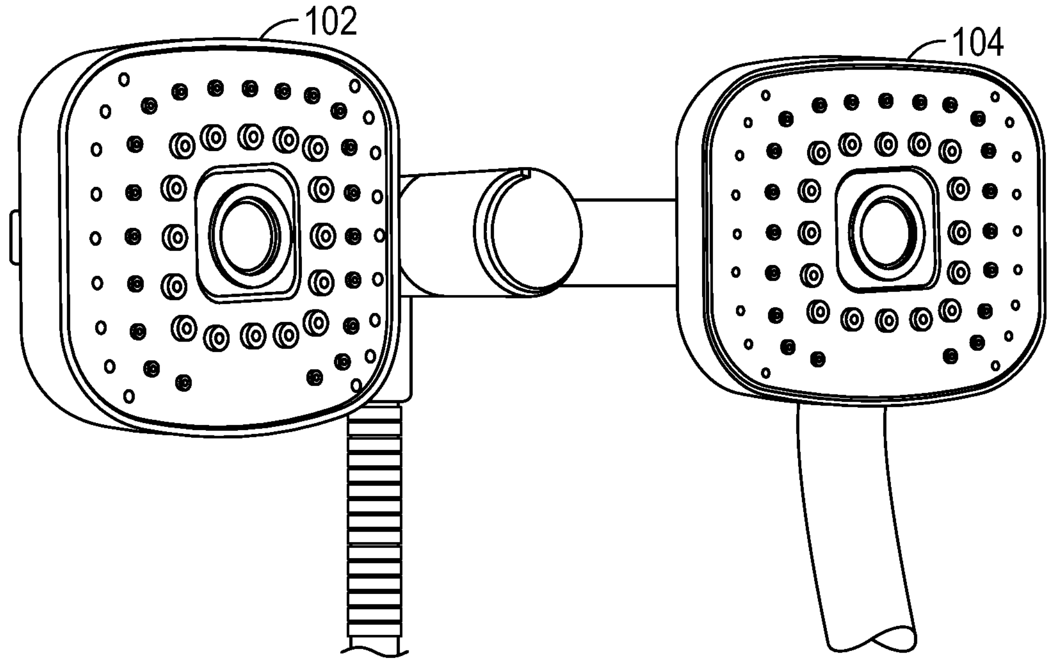
FIG. 10 is a perspective view of an alternative showerhead and removable hand shower shape of the shower assembly shown in FIG. 1.

Referring to FIG. 6, a diverter controller 136 of the shower assembly 100 is shown in detail. A diverter controller 136, allows the user to select between water flowing to the showerhead 102, to the removable hand shower 104, or to both, by rotating the diverter controller 136 relative to the inlet assembly 106. The diverter controller 136 is coupled to the diverter valve 128 such that when the diverter controller 136 is rotated, the diverter valve 128 rotates. When the diverter valve 128 rotates, the water is diverted between the first and second paths. The illustrated diverter controller 136 does not have stops and is rotatable indefinitely. If the diverter controller 136 is pointing, which may be indicated by a notch, for instance, at the showerhead 102, then the water will be directed down the first path toward the showerhead 102, and if the diverter controller 136 is pointing at the removable hand shower 104, the water will be directed down the second path toward the removable hand shower 104. If the diverter controller 136 is pointing between the showerhead 102 and the removable hand shower 104, the water will be directed down both the first and second paths and provide water to both the showerhead 102 and the removable hand shower 104. As such, the water may be directed entirely down the first path, entirely down the second path, or equally to them both (i.e. 50% to the first path and 50% to the second path). Alternatively, depending on the orientation of the diverter controller 136, the proportion that the water is directed between the two paths may vary (e.g., 40% to the showerhead 102 and 60% to the removable hand shower 104, 30% to the showerhead 102 and 70% to the removable hand shower 104, 25% to the showerhead 102 and 75% to the removable hand shower 104, vice versa, etc.). The notch, for instance, of the diverter controller 136 is oriented with the arms and will always point to which path the water will be directed (i.e. rotating the first and second arms 108, 110 does not change water pathways).

Referring to FIGS. 7-10, a variety of shapes for the showerhead 102 and the removable hand shower 104 of shower assembly 100 are shown. The nozzle heads for both the showerhead 102 and removable hand shower 104 may be round, square, or have any suitable shape. Further, each of the showerheads 102 and removable hand showers 104 can include a variety of water nozzles for spraying water as one or more patterns or sprays.

Figure 11:
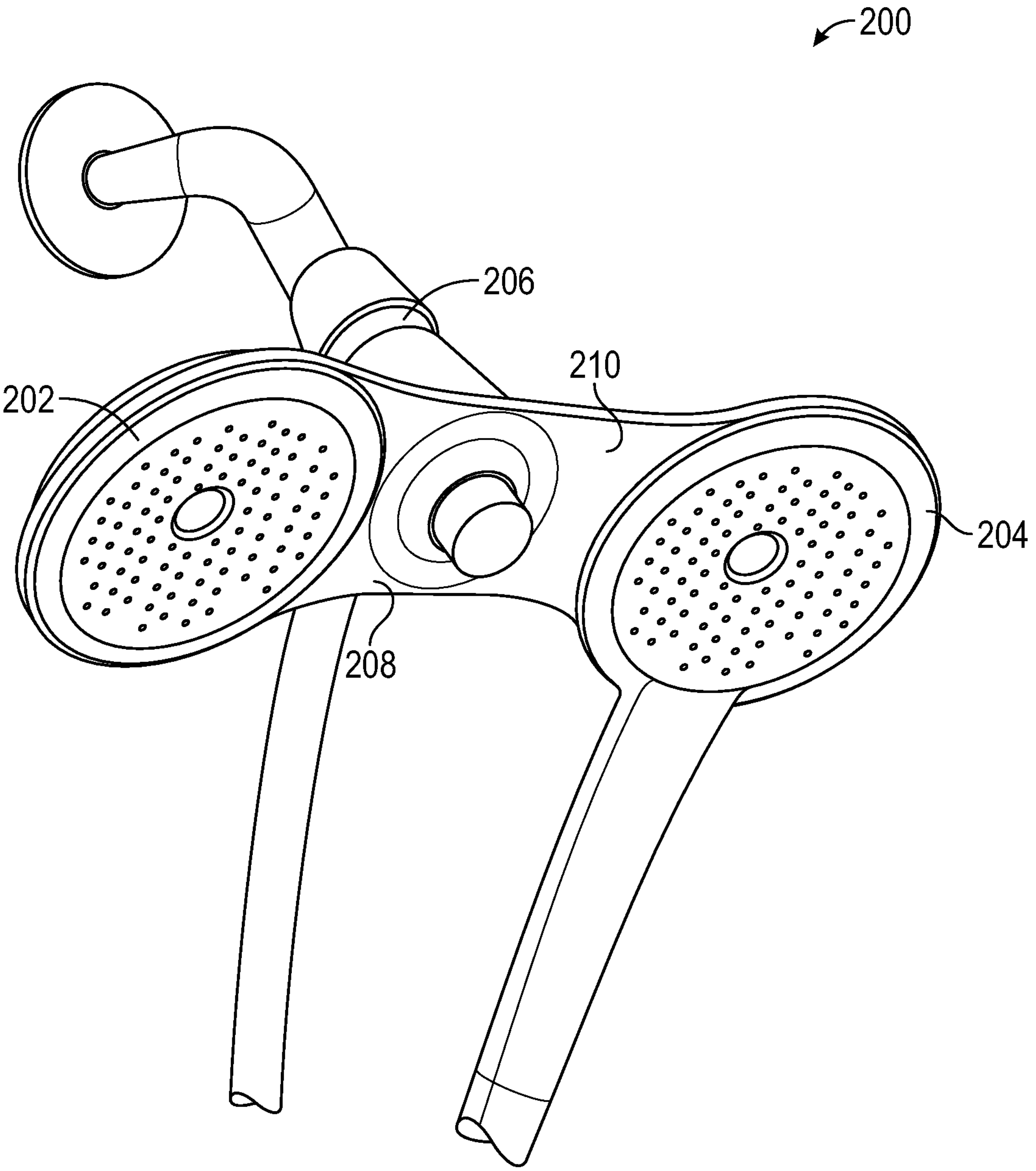
FIG. 11 is a perspective view of a shower assembly according to an exemplary embodiment.

Referring to FIG. 11, a shower assembly 200 is shown according to an exemplary embodiment. The shower assembly 200 includes a showerhead 202, a removable hand shower 204, and an inlet assembly 206. The showerhead 202 is fixed to a first wing 208 of inlet assembly 206. The illustrated showerhead 202 is a multifunction showerhead with non-dynamic (e.g. not oscillating) nozzles, although any showerhead can be employed.

Figure 12:
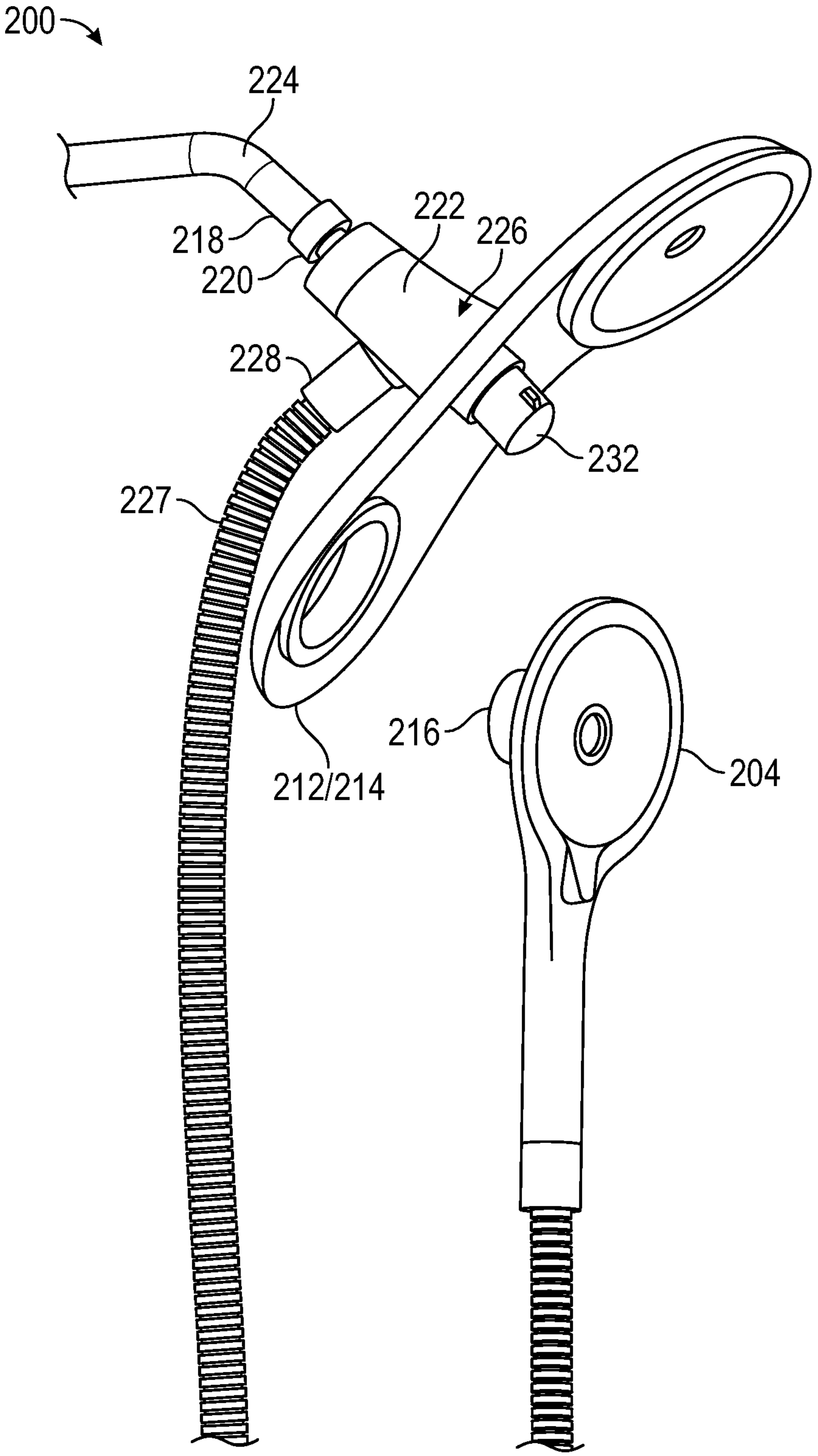
FIG. 12 is a perspective view of the shower assembly shown in FIG. 11.

As shown in FIG. 12, the shower assembly 200 is shown in further detail. The removable hand shower 204 magnetically docks to a docking cradle 212 disposed on an end of a second wing 210 of inlet assembly 206. The docking cradle 212 is fixed to the second wing 210. The removable hand shower 204 nests in the fixed docking cradle 212, such that there are no other mechanical mechanisms holding the removable hand shower 204 in place. The illustrated removable hand shower 204 is a multifunction showerhead with non-dynamic (e.g. not oscillating) nozzles, although any showerhead can be employed. The first and second wings 208, 210 provide a sleeker design solution without eliminating any benefits of the dual shower assembly.

The illustrated docking cradle 212 includes a magnet 214 and an opening disposed on the second wing 210 sized to receive a knob 216 on the backside of the removable hand shower 204. The magnet 214 may be a single magnet or may be a plurality of magnets. The magnet 214 may be a large ring magnet located in the docking cradle 212 which attracts a ferromagnetic element (e.g. a steel ring (shown as a knob 216)) located in the removable hand shower 204. Alternatively, a magnet may be located in the knob 216 and the docking cradle 212 is a ferromagnetic element, or both the docking cradle 212 and the knob 216 are magnets. The steel ring or knob, for example, is located on a back surface of the spray face of the removable hand shower 204. A handle of the removable hand shower 204 is not used to dock. This is advantageous in the same manner described above for docking member 112. The system could employ magnets in either one or both of the docking cradle 212 or the removable hand shower 204. For instance, the magnets may be standard Neodymium magnet(s) ranging from N38-N52, but any suitable magnet may be employed.

The inlet assembly 206 includes an inlet end 218 for mounting to a wall/support and for receiving a water supply. The inlet end 218 may include a threaded portion for securing the inlet end 218 to a water pipe and a ball joint 220 that allows for rotation of the inlet assembly 206. The shower assembly 200 includes a pivot 222, which is a circumferential base rotatable about the inlet assembly 106. The first and second wings 208, 210 extend from opposite sides of the pivot 222 and have a fixed configuration relative to each other (i.e., the first and second wings 208, 210 do not rotate separately). In this way, the showerhead 202 and the removable hand shower 204 can rotate from a horizontal configuration to a vertical configuration about an axis of the pivot 222, as illustrated between FIGS. 11 and 12. Note that the first and second wings 208, 210 and the pivot 222 can be integrally formed or formed separately and coupled together. The shower base 224 may remain stationary such that the wings rotate about the shower base 224. The shower assembly 200 may include magnets or other locking feature every 90 degrees to lock in place, and the pivot 222 may allow continuous 360 degree rotation of the showerhead 202 and the removable hand shower 204. This rotation provides for a fully customizable shower configuration. During any rotation, the removable hand shower 204 may be docked to the docking cradle 212 and will remained docked, unless removed by the user.

A diverter valve 226 is located in the inlet assembly 206 to direct water between a first path, which supplies water to the showerhead 202, and a second path, which supplies water to the removable hand shower 204 in a manner as explained above in reference to diverter valve 128 (i.e., diverter valve 226 may work in conjunction with the diverter controller 232, etc.). It is important to note that the diverter valve 226 rotates with the pivot 222. The first path is located within the shower base 224 and is fluidly connected to a first outlet (not shown) of the diverter valve 226. The second path is defined by a flexible hose 227 that interconnects a second outlet 228 of the diverter valve 226 to an inlet 230 of the removable hand shower 204.

A diverter controller 232 allows the user to select between water flowing to the showerhead 202, to the removable hand shower 204, or to both, by rotating the diverter controller 232. If the diverter controller 232 is pointing, which may be indicated by a notch, for instance, at the showerhead 202, then the water will be directed down the first path going, and if the diverter controller 232 is pointing at the removable hand shower 204, the water will be directed down the second path. The water may be directed entirely down the first path, entirely down the second path, or equally to them both (i.e. 50% to the first path and 50% to the second path).

Figure 13:
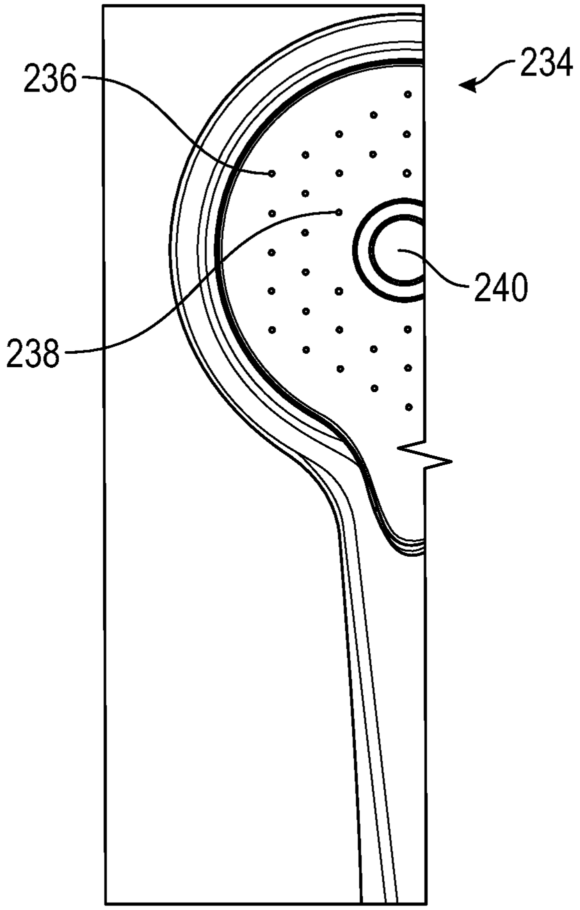
FIG. 13 is a detailed view of a removable hand shower of the shower assembly shown in FIG. 11.

Referring to FIG. 13, a spray face 234 of the shower assembly 200 is shown in detail The spray face 234 may be a smooth canvas, providing a minimal, textured spray face. The spray face 234 may include a plurality of settings for the user to choose between. For instance, the user may choose to have a full coverage flow 236, a massage flow 238, or a silk flow 240.

Figure 14:
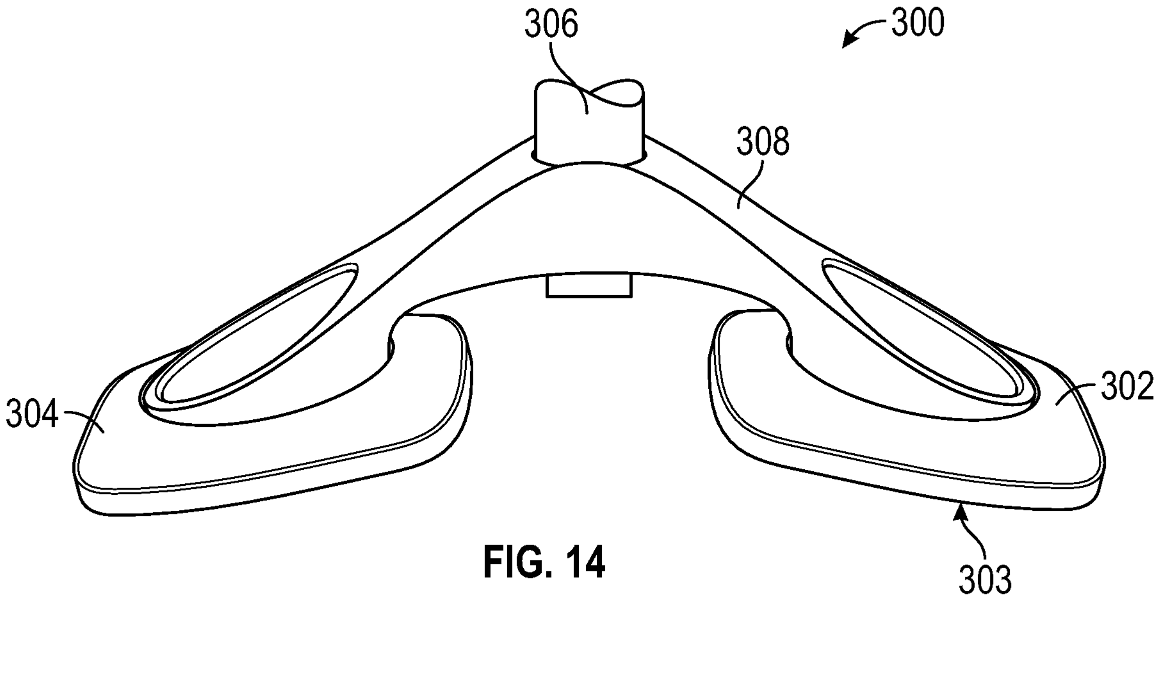
FIG. 14 is a perspective view of a shower assembly according to an exemplary embodiment.
Figure 16:
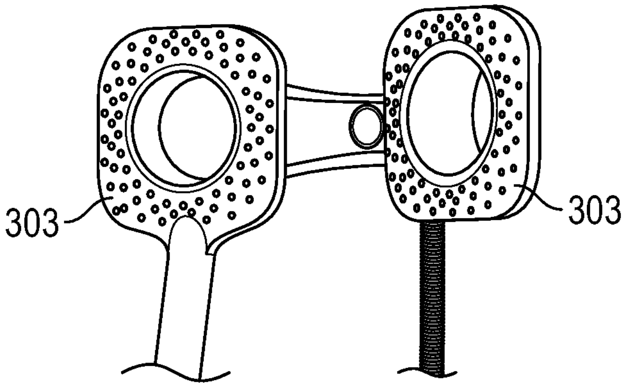
FIG. 16 is a perspective view of an alternative showerhead and removable hand shower shape of the shower assembly shown in FIG. 14.
Figure 17:
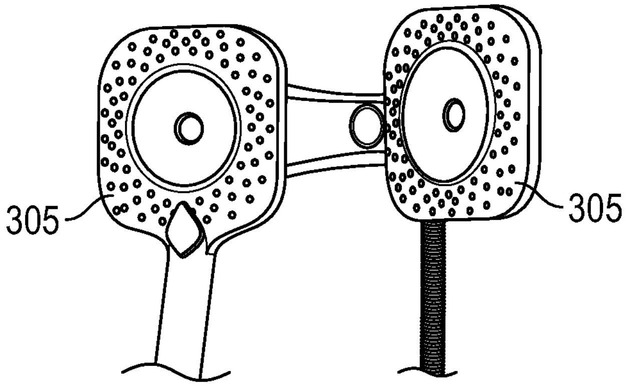
FIG. 17 is a perspective view of an alternative showerhead and removable hand shower shape of the shower assembly shown in FIG. 14.
Figure 18:
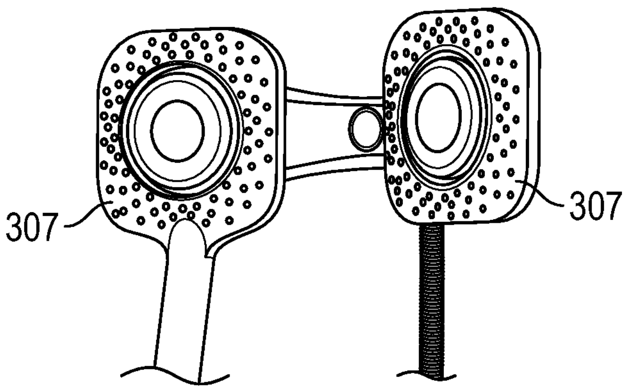
FIG. 18 is a perspective view of an alternative showerhead and removable hand shower shape of the shower assembly shown in FIG. 14.

Referring to FIG. 14, a shower assembly 300 is shown according to an exemplary embodiment. The shower assembly 300 includes a showerhead 302, a removable hand shower 304, and an inlet assembly 306. The showerhead 302 is fixed to a first arm 308 of inlet assembly 306. The illustrated showerhead 302 includes a single-function spray face 303 with non-dynamic (e.g. not oscillating) nozzles, although any showerhead can be employed. FIG. 16 is a front facing view of the single-function spray face 303. FIGS. 17 and 18 illustrate alternative multi-function spray faces 305, 307. The showerhead 302 is configured with a hollow middle, wherein the user may be able customize the function of the center. For example, the center of showerhead 302 may be single-function, multifunction, KOHLER Konnect™ modules center, herein incorporated by reference is U.S. patent application Ser. No. 13/605,587, filed Sep. 6, 2012, etc. Further, the user may couple a plurality of items (e.g. mini TV, lighting, etc.) in the middle. The items may be coupled with a magnet or mechanically. For example, the item may be docked to the shower assembly 300 with aligning features, hooks, clips, etc.

Figure 15:
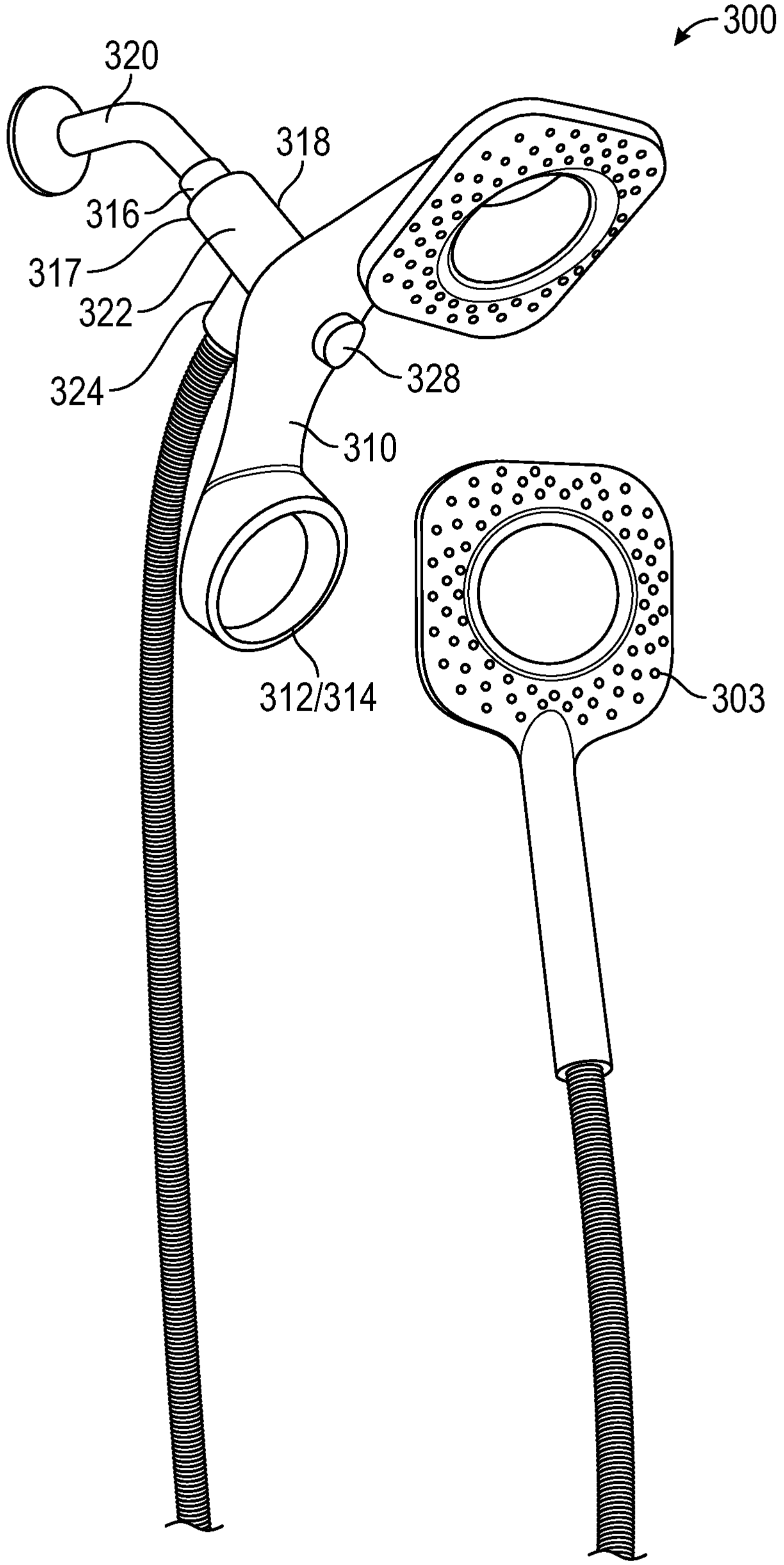
FIG. 15 is a perspective view of the shower assembly shown in FIG. 14.

As shown in FIG. 15, the shower assembly 300 is shown in further detail. The removable hand shower 304 magnetically docks to a docking member 312 disposed on an end of a second arm 310 of the inlet assembly 306. The removable hand shower 304 couples to the fixed docking member 312. The illustrated removable hand shower 304 includes a single-function spray face 303 with non-dynamic (e.g. not oscillating) nozzles, although any showerhead can be employed. Similarly to the showerhead 302, the removable hand shower 304 may include alternative spray faces, 305, 307 and/or is configured with a hollow middle, wherein the user may be able customize the function of the center, as noted above in regard to the showerhead 302 (FIGS. 16-18).

The docking member 312 includes a magnet 314 and does not include any mechanical feature other than an opening disposed on the second arm 310 sized to receive the backside of the removable hand shower 304. The magnet 314 may be a single magnet or may be a plurality of magnets. The magnet 314 may include four magnets located in the docking member 312 and two magnets located in the removable hand shower 304. The magnets located in the removable hand shower 304 may be positioned 180 degrees from each other. Similarly to shower assemblies 100, 200, a handle of the removable hand shower 304 is not used to dock. This is advantageous in the same manner described above for docking member 112. Alternatively, the docking member 112 of shower assembly 100 may be utilized wherein a magnetic docking system is using in conjunction with a mechanical docking feature. Further, docking mechanism may be included wherein the docking member 312 is configured to cradle the removable hand shower 304. For example, the docking member 312 may be sized and shaped to receive a protruding feature on the backside of the removable hand shower 304 which is placed and rests within the docking member 312.

The inlet assembly 306 includes an inlet end 316 for mounting to a wall/support and for receiving a water supply. The inlet end 316 may include a threaded portion for securing the inlet end 316 to a water pipe and a ball joint 317 that allows for rotation of the inlet assembly 306. The shower assembly 300 includes a pivot 318, which is a circumferential base rotatable about the inlet assembly 306. The first and second arms 308, 310 extend from opposite sides of the pivot 318 and have a fixed configuration relative to each other (i.e., the first and second arms 308, 310 do not rotate separately). In this way the showerhead 302 and the removable hand shower 304 can rotate from a horizontal configuration to a vertical configuration about an axis of the pivot 318. Note that the first and second arms 308, 310 and the pivot 318 can be integrally formed or formed separately and coupled together. The shower base 320 may remain stationary such that the arms rotate about the shower base 320. The shower assembly 300 may include detents or other locking features every 90 degrees to lock in place, and the pivot 318 may allow continuous 360 degree rotation of the showerhead 302 and the removable hand shower 304. This rotation provides for a fully customizable shower configuration. During any rotation, the removable hand shower 304 may be docked to the docking member 312 and will remained docked, unless removed by the user.

A diverter valve 322 is located in the inlet assembly 306 to direct water between a first path, which supplies water to the showerhead 302, and a second path, which supplies water to the removable hand shower 304. The diverter valve 322 is a rocker switch diverter. It is important to note that the diverter valve 322 rotates with the pivot 318. The first path is defined by the first arm 308 and is fluidly connected to a first outlet (not shown) of the diverter valve 322. The second path is defined by a flexible hose 323 that interconnects a second outlet 324 of the diverter valve 322 to an inlet 326 of the removable hand shower 304.

A diverter controller 328 allows user to select between water flowing to the showerhead 302, to the removable hand shower 304, or to both, by rotating the diverter controller 328. If the diverter controller 328 is pointing, which may be indicated by a notch, for instance, at the showerhead 302, then the water will be directed down the first path going, and if the diverter controller 328 is pointing at the removable hand shower 304, the water will be directed down the second path. With a rocker switch diverter such as diverter valve 322, the diverter controller 328 is limited to distinct left, middle and right selections, as opposed to a continuous rotational movement. Alternatively, the diverter controller 328 may be a push-button. The water may be directed entirely down the first path, entirely down the second path, or equally to them both (i.e. 50% to the first path and 50% to the second path).

Figure 19:
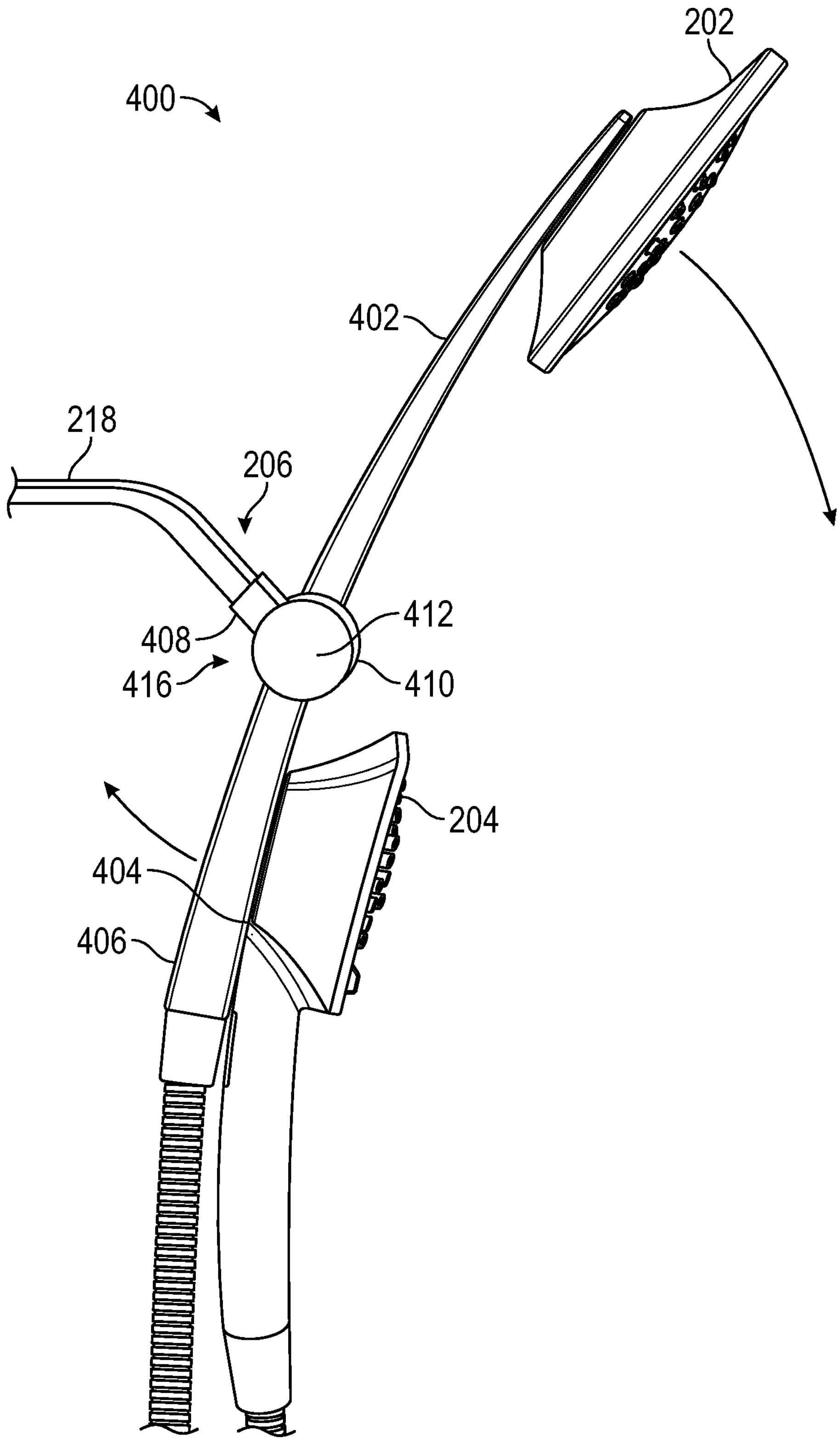
FIG. 19 is a perspective view of a shower assembly according to an exemplary embodiment.
Figure 20:
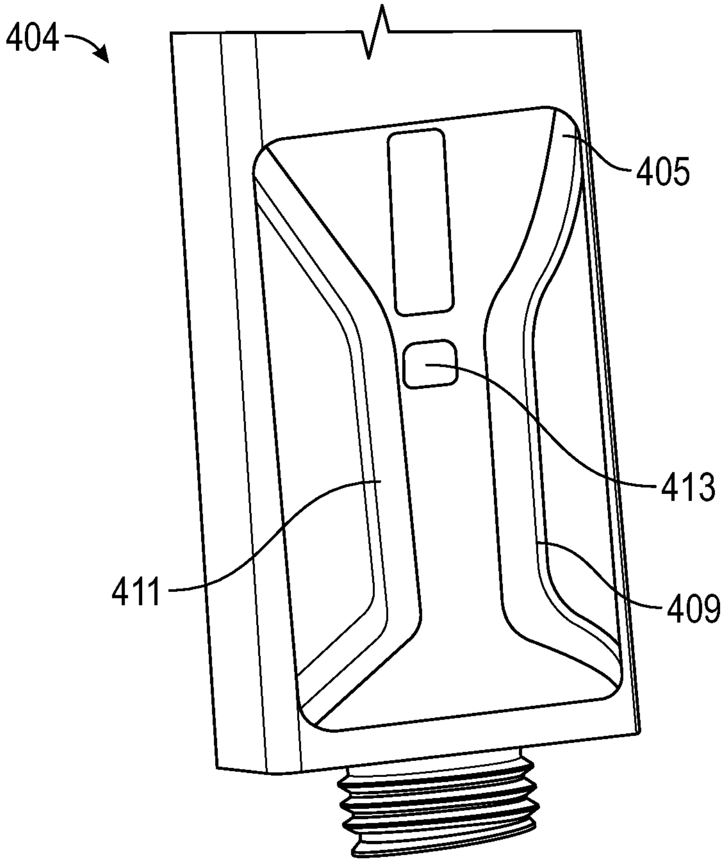
FIG. 20 is a detailed view of a docking mechanism of the shower assembly shown in FIG. 19.
Figure 21:
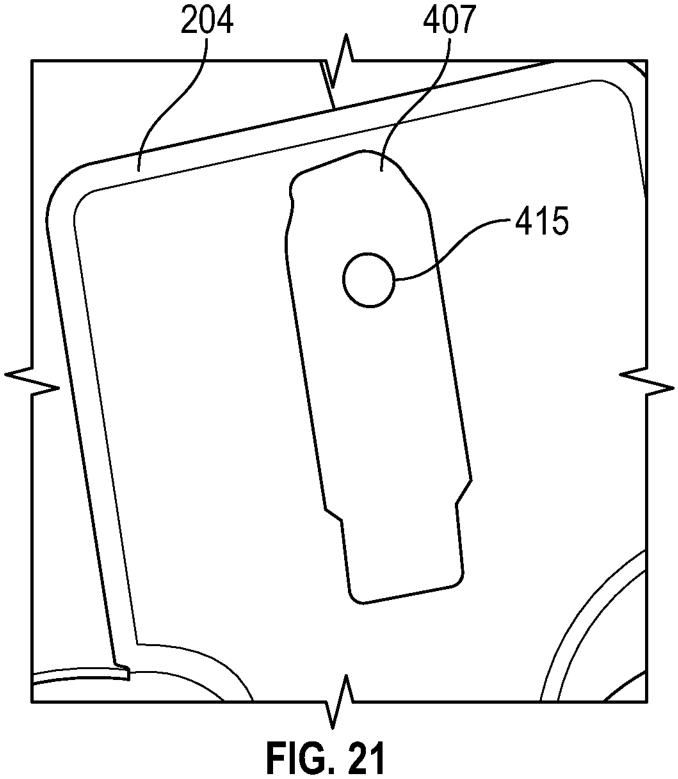
FIG. 21 is a detailed view of a docking mechanism of the shower assembly shown in FIG. 19.
Figure 27:
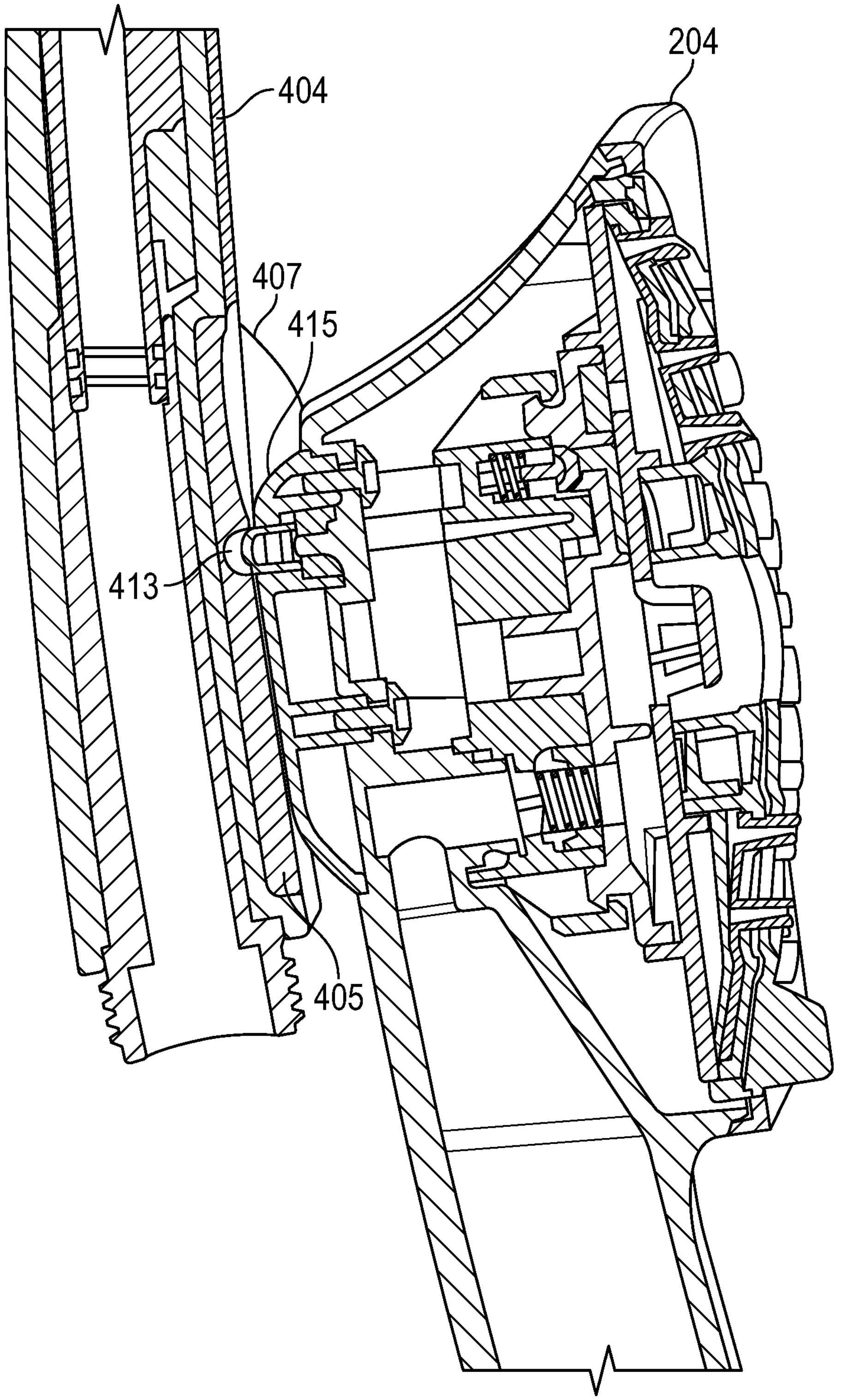
FIG. 27 is a cross-sectional view of a removable hand shower docked to a docking mechanism of the shower assembly shown in FIG. 19.

Referring now to FIGS. 19-21, a shower assembly 400 is described according to an exemplary embodiment. The shower assembly 400 includes elements as referenced herein and thus those descriptions apply. The shower assembly 400 includes a showerhead 202, a removable hand shower 204, and an inlet assembly 206. The showerhead 202 is fixed to a first arm 402 of inlet assembly 206. In shower assembly 400, the removable hand shower 204 mechanically docks to a docking mechanism 404 disposed on an end of a second arm 406 of inlet assembly 206. The docking mechanism 404 is fixed to the second arm 406. The illustrated removable hand shower 204 slide-locks to the fixed docking mechanism 404, although a magnetic system could be employed. As is detailed in FIGS. 20-21, the docking mechanism 404 includes a slotted surface 405 which is configured to engage with a flanged plate 407 coupled to a back side of the removable hand shower 204. A cross-sectional view of the docking mechanism 404 is provided in FIG. 27. The slotted surface 405 includes two opposing tabs 409, 411 which are sized to receive the flanged plate 407, and an ending notch 413 disposed between the tabs 409, 411. The flanged plate 407 includes a spring loaded pin 415 disposed on the surface configured to face the slotted surface 405. In operation, the flanged plate 407 of the removable hand shower 204 is aligned with the slotted surface 405 of the docking mechanism 404, and is slid between the tabs 409, 411 toward the ending notch 413. The spring loaded pin 415 engages with the ending notch 413 to lock into place. To remove the removable hand shower 204, a light upward force is required to be placed on the removable hand shower 204, such that the spring loaded pin 415 is released from the ending notch 413 and the flanged plate 407 may be slid back up and out of the slotted surface 405. With such a docking system, any use of magnetic elements is not necessary.

Figure 31:
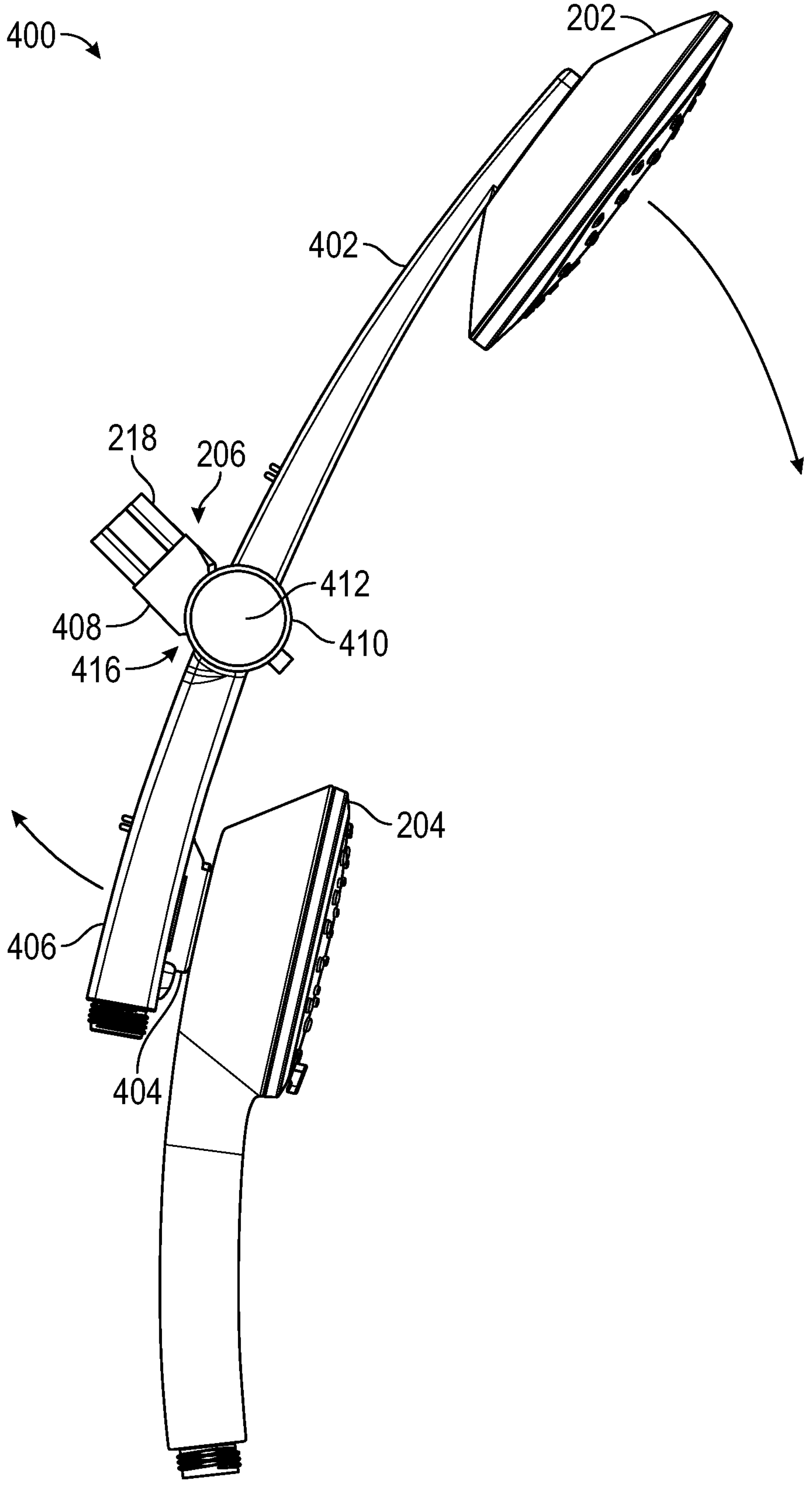
FIG. 31 is a perspective view of a shower assembly according to an exemplary embodiment.
Figure 32:
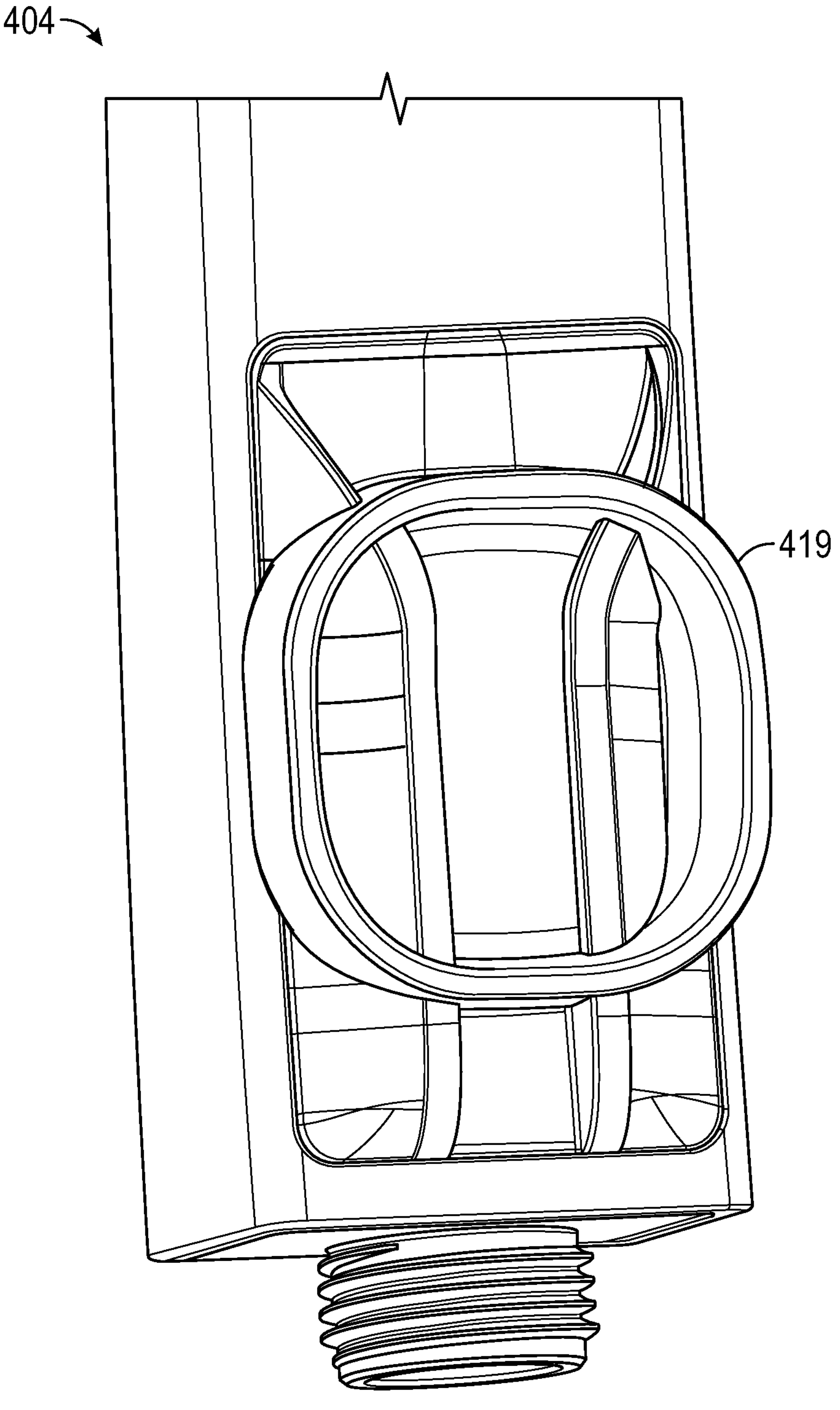
FIG. 32 is a detailed view of a docking mechanism of the shower assembly shown in FIG. 31.
Figure 33:
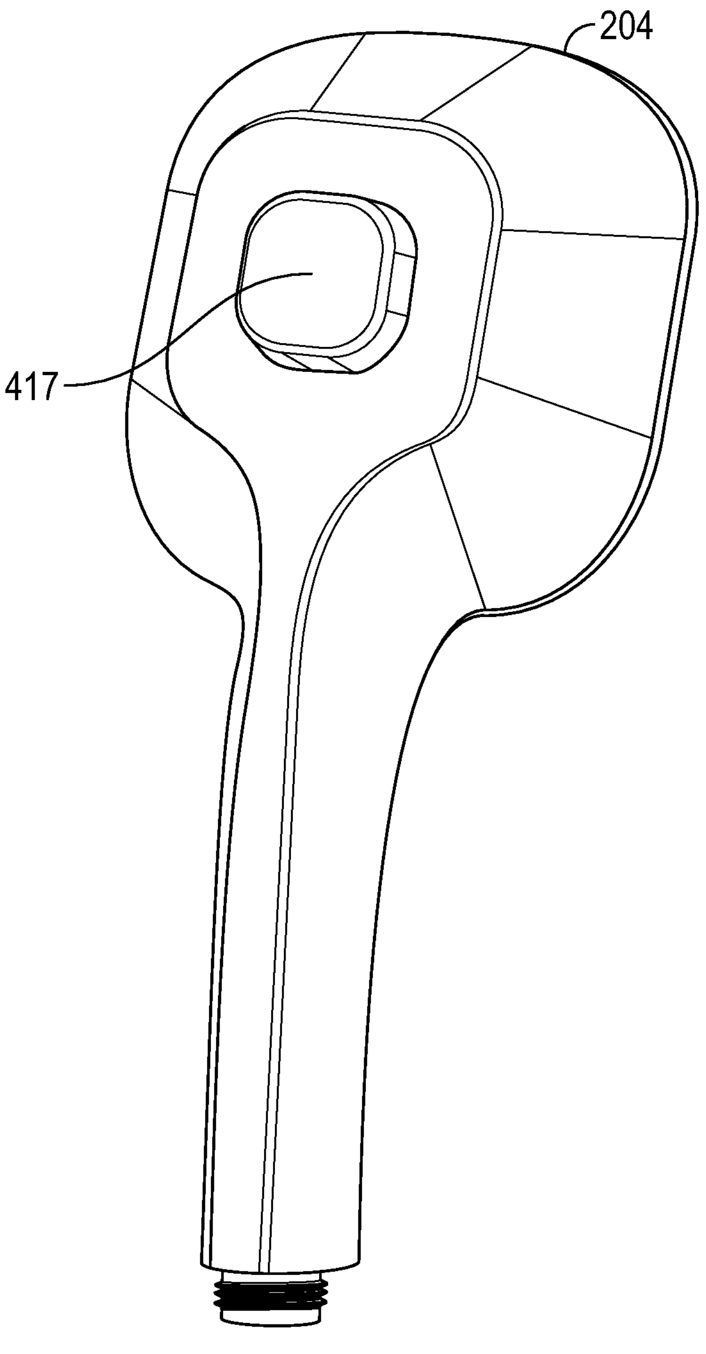
FIG. 33 is a detailed view of a docking mechanism of the shower assembly shown in FIG. 31.

In another embodiment of the shower assembly 400, the removable hand shower 204 magnetically docks to the docking mechanism 404. As is detailed in FIGS. 31-33, and similarly to the magnets described with reference to FIGS. 2-3, 22-24, and 29-30, the docking mechanism 404 includes a magnet 114. The magnet 114 may be a single magnet or a plurality of magnets. The magnet 114 may be a disc magnet located in the docking mechanism 404 which attracts a ferromagnetic element (e.g. a steel disc) located in the removable hand shower 104 (e.g., a raised plate 417). The magnet 114 may be placed within the docking mechanism 404 such that the magnet 114 is behind the surface. The magnet 114 may be in the perimeter of the docking mechanism 404 (i.e., a rounded flange 419) in order to leave space for the removable hand shower 204 to be slightly inserted. For instance, the steel disc to which the magnet 114 is attracted, is located on a back surface of the spray face of the removable hand shower 204, as illustrated in FIG. 33 with the raised plate 417. The raised plate 417 is sized and shaped to fit within the rounded flange 419 of the docking mechanism 404 and in operation, is aligned with the rounded flange 419 of the docking mechanism 404 until the magnets engage, thus allowing the magnet 114 to contact the steel disk while providing supplementary support. As such, a handle of the removable hand shower 204 is not used to dock. This allows for easy handling when removing and returning the removable hand shower 204 from the shower assembly 400 such that the inconvenience of placing a handle in a holder, tangling the hose, etc. is eliminated. The system could employ magnets in either one or both of the docking mechanism 404 or the removable hand shower 204.

[0067] The inlet assembly 206 includes an inlet end 218 for mounting to a wall/support and for receiving a water supply. A floating nut 408 is rotatably coupled to the inlet end 218 to allow some movement of the shower assembly 400 clockwise and counterclockwise. A pivot 410 operatively couples to the first and second arms 402, 406, such that both arms rotate relative to the inlet end 218 in a fore-and-aft direction (i.e. front-to-back). The first and second arms 402, 406 extend from opposite sides of the pivot 410 and have a fixed configuration relative to each other (i.e., the first and second arms 402, 406 do not rotate separately). In this way, the showerhead 202 can tilt and the removable hand shower 204 may have around 10 degrees of rotation about an axis of the pivot 410. As shown in FIG. 19 with arrows, the removable hand shower 204 pivots rearward and upward as the showerhead 202 pivots forward and downward, and thus the removable hand shower 204 would pivot forward and downward as the showerhead 202 pivots rearward and upward. In this way, the locations of the showerhead 202 and removable hand shower 204 can be adjusted by a user. During any rotation, the removable hand shower 204 may be docked to the docking mechanism 404 and will remained docked, unless removed by the user.

Figure 28:
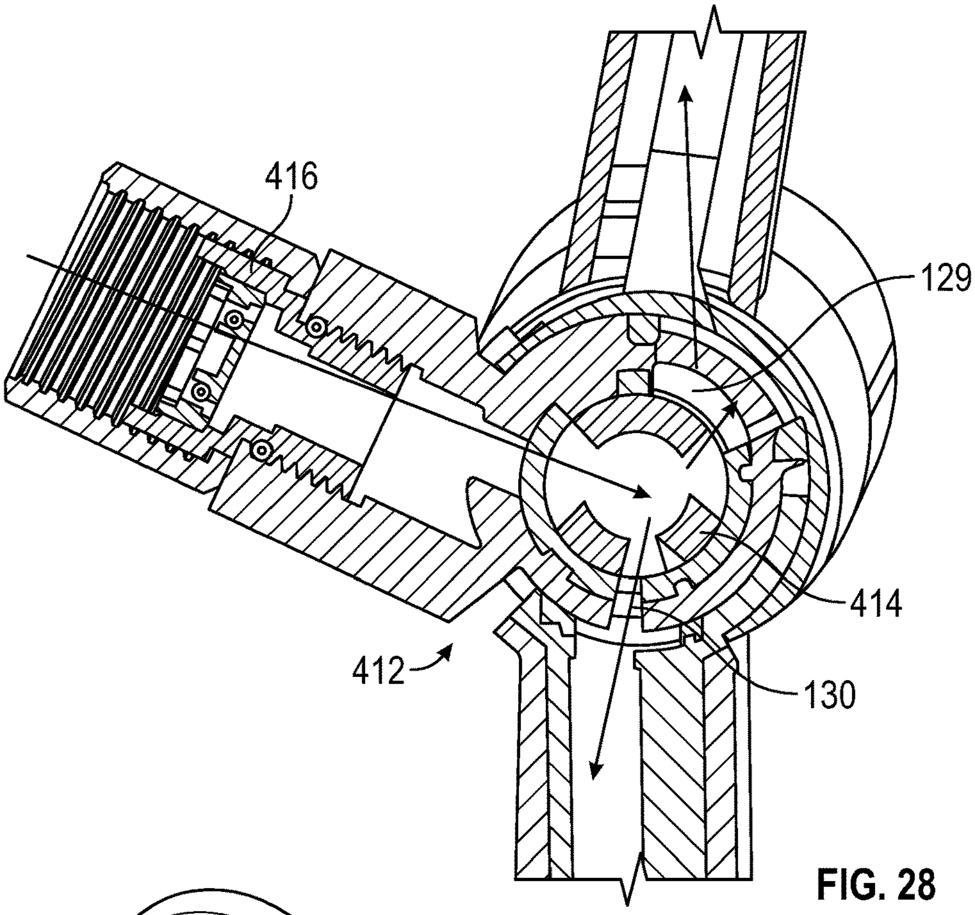
FIG. 28 is a cross-sectional view of a diverter valve of the shower assembly shown in FIG. 19.

A diverter valve 416 is located in the inlet assembly 206 to direct water between a first path, which supplies water to the showerhead 202, and a second path, which supplies water to the removable hand shower 204, generally in a manner as explained above in reference to other diverter valves. The diverter controller 412 is located on the side of the shower assembly 400. A cross-sectional view of the diverter valve 416 is provided in FIG. 28 wherein the optional water paths are illustrated. A diverter controller 412 (FIG. 19) allows the user to select between water flowing to the showerhead 202, to the removable hand shower 204, or to both, by rotating the diverter controller 412. For instance, when diverter controller 412 is rotated, a stopper mechanism 414 is rotated. The stopper mechanism has three opening which corresponds to the three path options. Due to openings, stopper mechanism 414 can block or release the water flow at the first and second outlets 129, 130. As such, the diverter controller 412 can rotate only a set angle in either direction. Rotation of the diverter controller 412 is independent of rotation of the first and second arms 402, 406. The selection the user is making may be indicated by a line or notch, for instance, lining up with indicator decals located on the shower assembly 400.

Thus, the present disclosure describes a shower assembly including a showerhead, a removable hand shower, and an inlet assembly. The shower assembly further includes a diverter valve, a rotational mechanism, and a docking member. Thus, the shower assembly can advantageously allow a user to selectively adjust the water flow path, the configuration of both the showerhead and the removable hand shower, and to have a greater range of motion by removing the removable hand shower from the shower assembly.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. In some cases, the actions recited herein can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A shower assembly comprising:

a stationary base;

an inlet assembly coupled with the stationary base at an inlet end;

a pivot rotatably coupled to the inlet assembly at an end opposite the inlet end and configured to rotate around a first axis of the pivot relative to the inlet assembly;

a hose connection positioned on the inlet assembly upstream of the pivot;

a first arm extending radially from the pivot in a first direction along a second axis perpendicular to the first axis;

a second arm extending radially from the pivot in a second direction along the second axis, opposite the first direction, wherein the first arm and the second arm are configured to rotate around the first axis of the pivot relative to the inlet assembly;

a showerhead disposed on an end of the first arm, wherein a first ball joint is disposed between the showerhead and the end of the first arm;

a docking member disposed on an end of the second arm, wherein a second ball joint is disposed between the docking member and the end of the second arm, the docking member comprising a magnet disposed therein; and a removable hand shower comprising:

a ferromagnetic element configured to magnetically couple to the magnet of the docking member, and a hose coupled to the hose connection of the inlet assembly.

2. The shower assembly of claim 1, wherein the inlet assembly receives a water supply.

3. The shower assembly of claim 2, wherein the inlet end is configured to couple to a third ball joint disposed between the inlet end and the stationary base.

4. The shower assembly of claim 2, wherein the inlet end comprises a threaded portion for securing the inlet end to the stationary base.

5. The shower assembly of claim 1, wherein the inlet assembly further comprises a diverter valve configured to rotate with the pivot and direct water between a first path and a second path such that water is diverted between the first and second paths while the first and second arms are rotated about the inlet assembly by the pivot.

6. The shower assembly of claim 5, wherein the first path is defined by the first arm and is fluidly connected to a first outlet of the diverter valve, such that the first path supplies water to the showerhead, and the second path is defined by a flexible hose and is fluidly connected to a second outlet of the diverter valve to an inlet of the removable hand shower, such that the second path supplies water to the removable hand shower.

7. The shower assembly of claim 5, wherein the diverter valve is configured to direct between 0% and 100% of the water to the first path and proportionally to the second path.

8. The shower assembly of claim 5, further comprising a user operable diverter controller coupled to the diverter valve such that when the diverter controller is rotated, the diverter valve rotates.

9. The shower assembly of claim 8, wherein the user operable diverter controller includes a notch oriented with the first and second arms, the notch configured to indicate whether the water is diverted to the first or second path.

10. The shower assembly of claim 1, wherein at least one of the removable hand shower and the showerhead is a multifunction showerhead with non-oscillating nozzles.

11. The shower assembly of claim 1, wherein the docking member comprises a ridge on a surface proximate the removable hand shower, wherein the removable hand shower comprises a depression, and wherein the ridge is configured to receive the depression when the removable hand shower is in a docking position.

12. The shower assembly of claim 11, wherein the ridge is configured to receive the depression when the removable hand shower is in the docking position to provide a secondary support when the magnet is not engaged with the ferromagnetic element.

13. The shower assembly of claim 11, wherein at least one of the ridge and the depression form a cross shape.

14. The shower assembly of claim 1, further comprising a casing protruding from an end of the removable hand shower, the casing configured to receive the magnet therein.

15. The shower assembly of claim 1, wherein the showerhead and the removable hand shower are rotatable in at least one of a vertical direction and a horizontal direction about an axis extending through the second ball joint.

16. The shower assembly of claim 1, further comprising a user operable diverter controller coupled to a diverter valve, the diverter controller configured to direct water in at least one of a first path and a second path.

17. A shower assembly comprising:

a stationary base;

an inlet assembly configured to rotate relative to the stationary base, the inlet assembly comprising:

a pivot rotatably coupled to the stationary base and configured to rotate around a first axis of the pivot relative to the stationary base;

a first arm extending radially from the pivot in a first direction along a second axis perpendicular to the first axis; and second arm extending radially from the pivot in a second direction along the second axis, opposite the first direction, wherein the first arm and the second arm are configured to rotate the first axis of around the pivot relative to the stationary base;

a showerhead disposed on an end of the first arm, wherein a first ball joint is disposed between the showerhead and the end of the first arm;

a docking member disposed on an end of the second arm, wherein a second ball joint is disposed between the docking member and the end of the second arm, the docking member comprising a magnet disposed therein; and a removable hand shower comprising a ferromagnetic element configured to magnetically couple to the magnet of the docking member in a plurality of different orientations relative to the docking member, the plurality of different orientations corresponding to a plurality of different rotational positions of the inlet assembly relative to the stationary base;

wherein the docking member comprises a ridge on a surface proximate the removable hand shower, wherein the removable hand shower comprises a depression, wherein the ridge is configured to receive the depression when the removable hand shower is in a docking position, and wherein at least one of the ridge and the depression form a cross shape.

* * * * *